United States Patent [19]
Mallory et al.

[11] 3,833,445
[45] Sept. 3, 1974

[54] TIRE BUILDING APPARATUS FOR BUILDING TIRES

[75] Inventors: Edwin E. Mallory, Niles, Mich.;
Emerson C. Bryant, South Bend, Ind.

[73] Assignee: National-Standard Company, Niles, Mich.

[22] Filed: Jan. 14, 1972

[21] Appl. No.: 217,787

[52] U.S. Cl................ 156/401, 156/132, 156/415, 156/420, 156/421
[51] Int. Cl...................... B29h 17/16, B29h 17/26
[58] Field of Search .......... 156/414, 415, 416, 417, 156/418, 419

[56] References Cited
UNITED STATES PATENTS

| | | | |
|---|---|---|---|
| 3,560,301 | 2/1971 | Cantarutti............................ | 156/401 |
| 3,560,302 | 2/1971 | Missioux.............................. | 156/415 |
| 3,562,062 | 2/1971 | Bryant................................. | 156/401 |
| 3,674,604 | 11/1969 | Gazuit................................. | 156/415 |
| 3,684,621 | 8/1972 | Frazier et al........................ | 156/401 |
| 3,692,605 | 9/1972 | Cantarutti............................ | 156/132 |
| 3,698,987 | 10/1972 | Woodhall et al. ................... | 156/401 |

*Primary Examiner*—Clifton B. Cosby
*Attorney, Agent, or Firm*—Johnson, Dienner, Emrich, Verbeck & Wagner

[57] ABSTRACT

A tire building apparatus about which tire carcass material is laid for formation of the tire carcass material into substantially the form of a completed tire in which the tire beads lie axially inwardly of the circular inner end portions of the sidewall portions of the tire carcass material, in which the sidewall portions of the tire carcass material are reversely curved from the crown of the tire carcass material and the inner end portions of the sidewall portions of the tire carcass material as in a completed or cured tire, and in which suitable means, such as a pair of inflatable bag means are provided, one for effecting turning up the end portions of the tire carcass material to encase the tire beads with the tire carcass material subsequent to formation of the tire carcass material into the aforenoted configuration, and the other for applying sidewall components to the sidewall portions of the tire carcass material after the tire beads have been encased in the end portions of the tire carcass material. The tire building apparatus as aforenoted embodying an expandable and contractable intermediate drum, end drum assemblies at opposite ends of the intermediate drum for supporting tire carcass material embodying tire bead supporting and locking means at the inner ends of the end drums in an arrangement including carrier means for the end drum assemblies and in which the tire bead supporting and locking means may be positioned with respect to the carrier means in equidistant axially spaced apart relation with respect to the transverse centerline of the intermediate drum, and concentrically of the longitudinal axis of the apparatus in which the tire bead supporting and locking means in operative position lock tire beads inwardly of the ends of the tire carcass material characterized by the association therewith of a pair of the aforenoted inflatable bag means being carried by each of the end drum assemblies in which the tire bead supporting and locking means in operative position lock the inner ends of the dual inflatable bag means together with the outer ends of the tire carcass material at the tire beads together with the tire beads, tire carcass back-up means operative to take the reaction of inflation of ply turn-up bag means to encase tire beads in the end portions after formation of the tire carcass material into the aforenoted configuration and inflation thereafter of sidewall applicator bag means of the pair of inflatable bag means operable together with bag pusher means for said sidewall applicator bag means to apply sidewall components to the tire carcass material. The apparatus as aforenoted in which the drum is pressurized to take the reaction of inflation of the inflatable bag means in the application of the sidewall components, and in which the formed tire carcass material is shaped to conform or substantially conform to that of a cured tire in the bead area.

19 Claims, 27 Drawing Figures

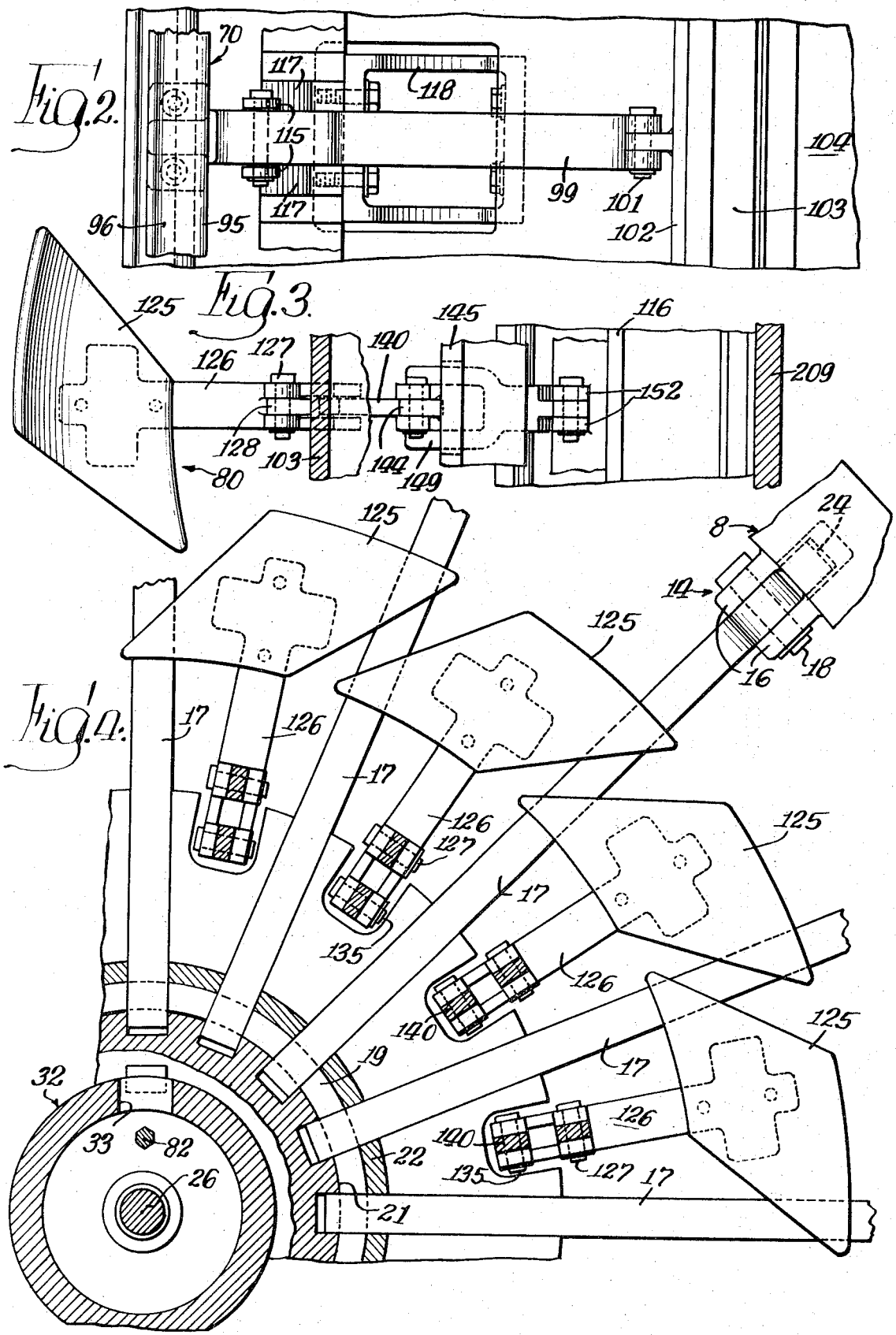

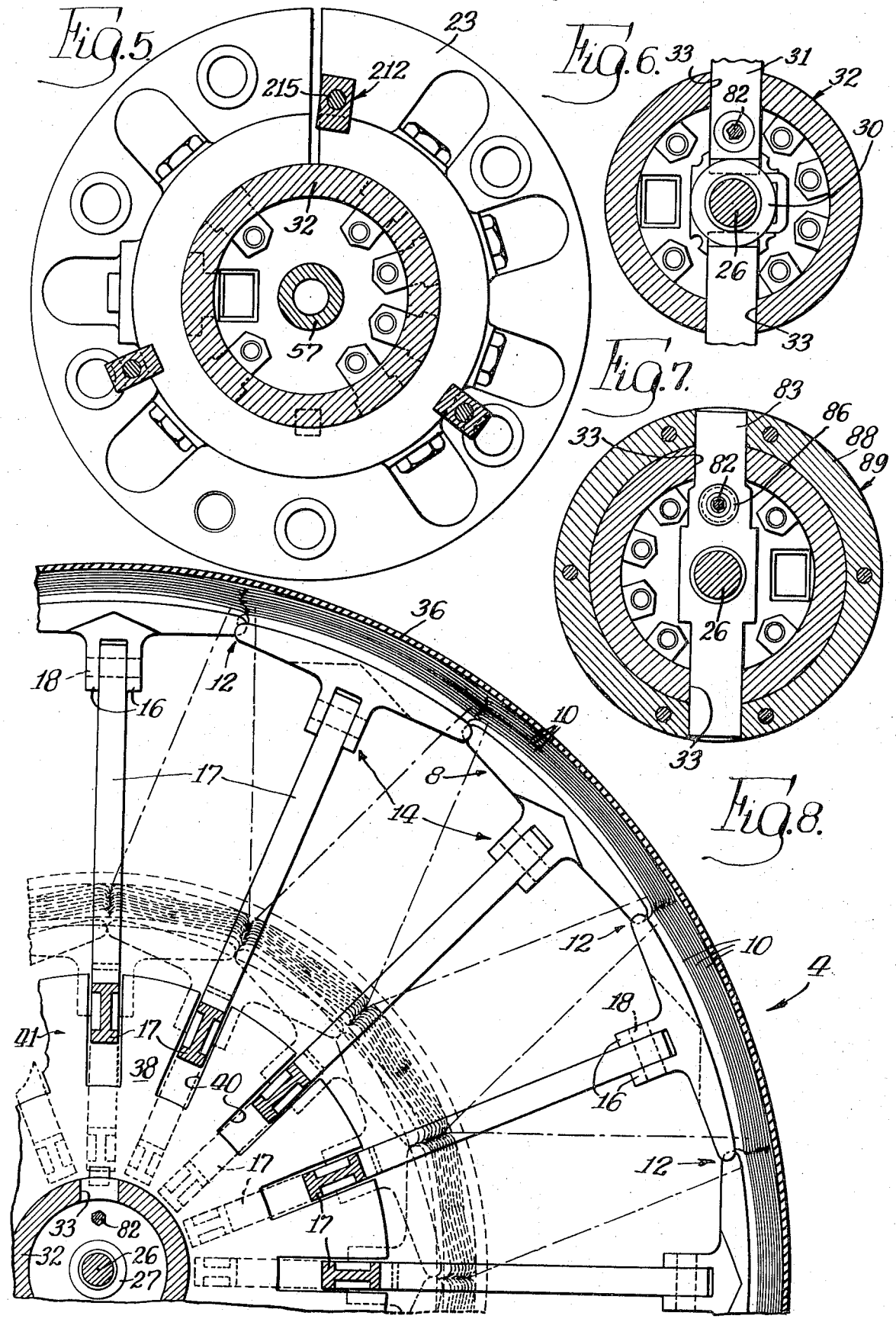

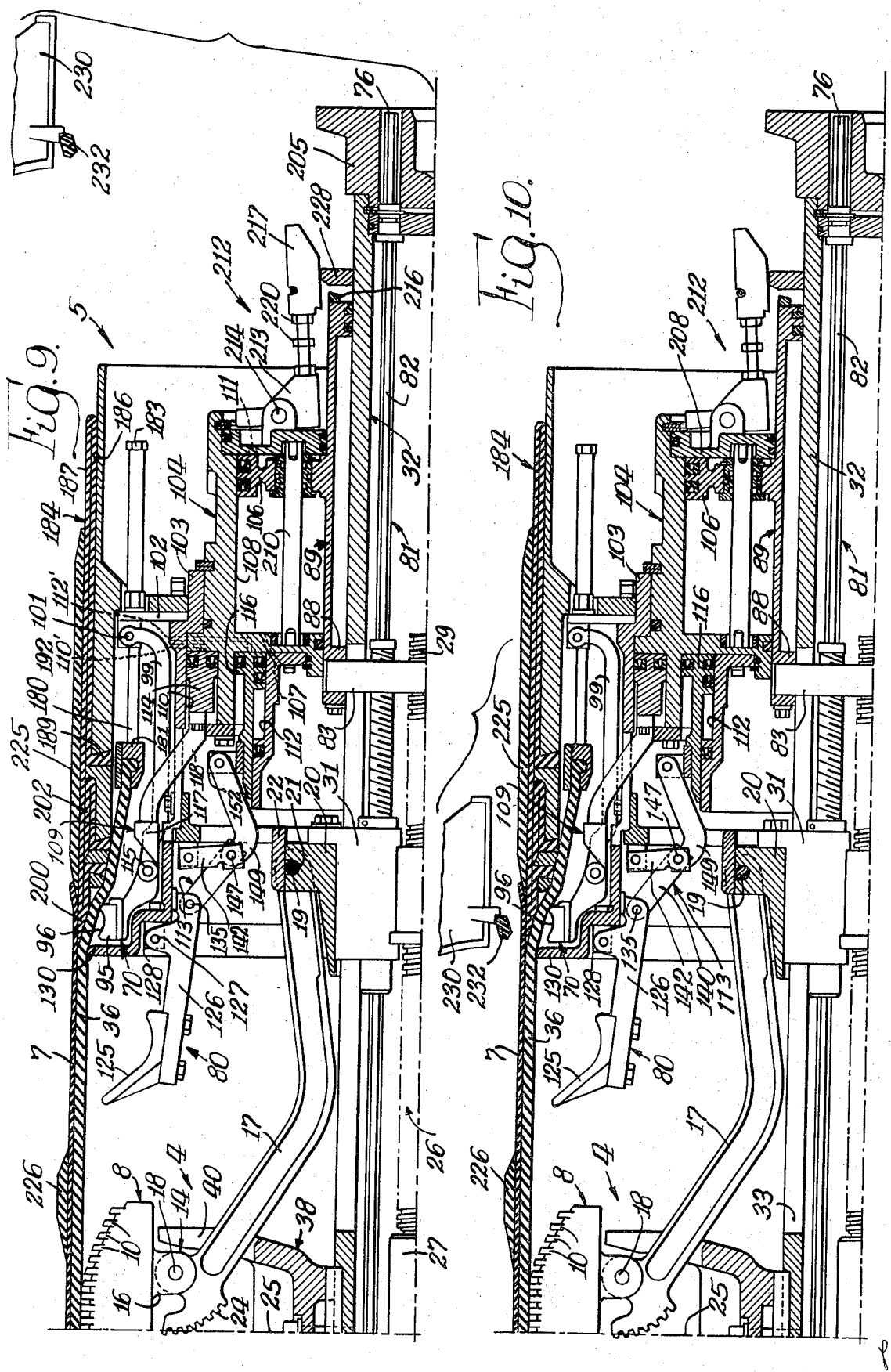

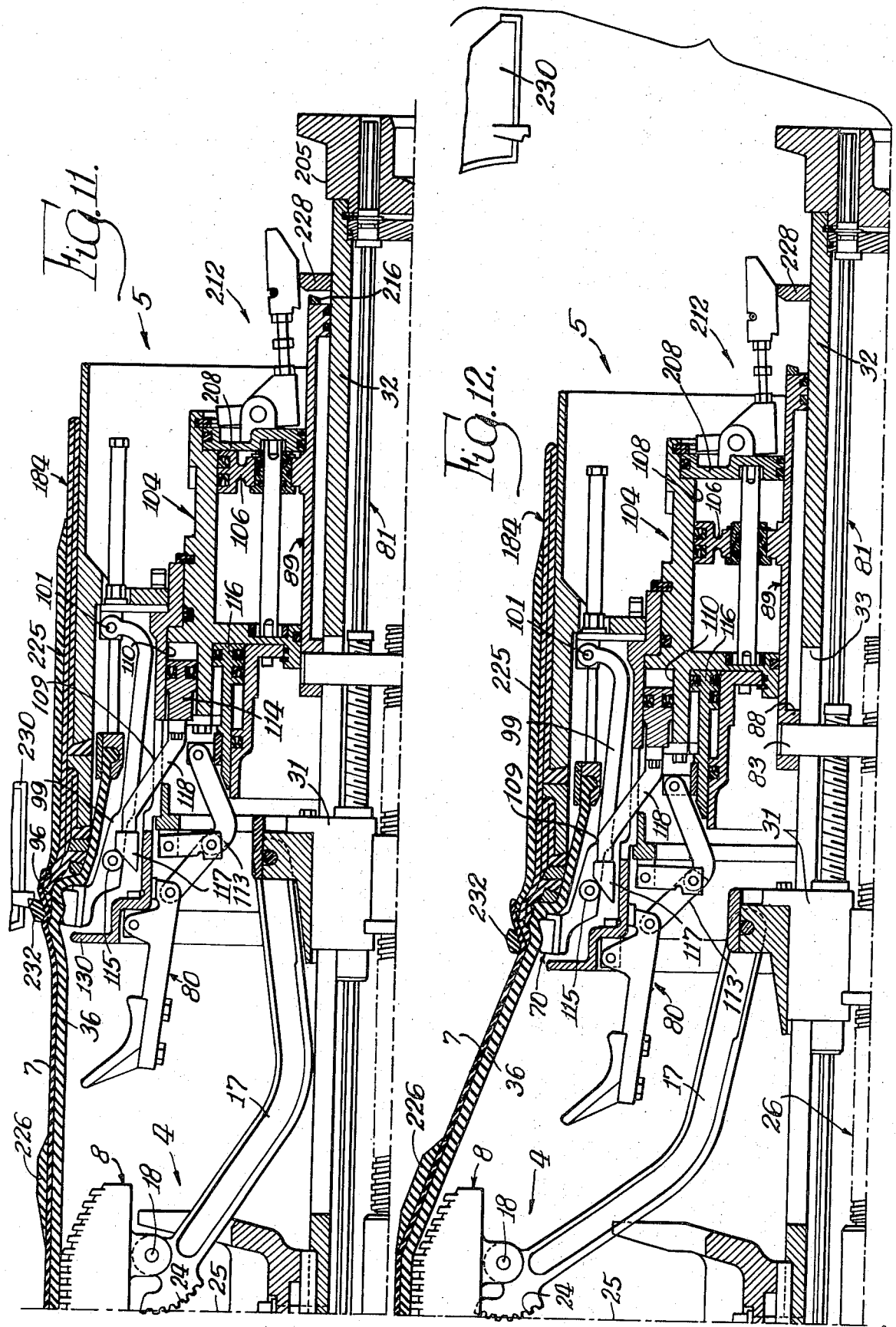

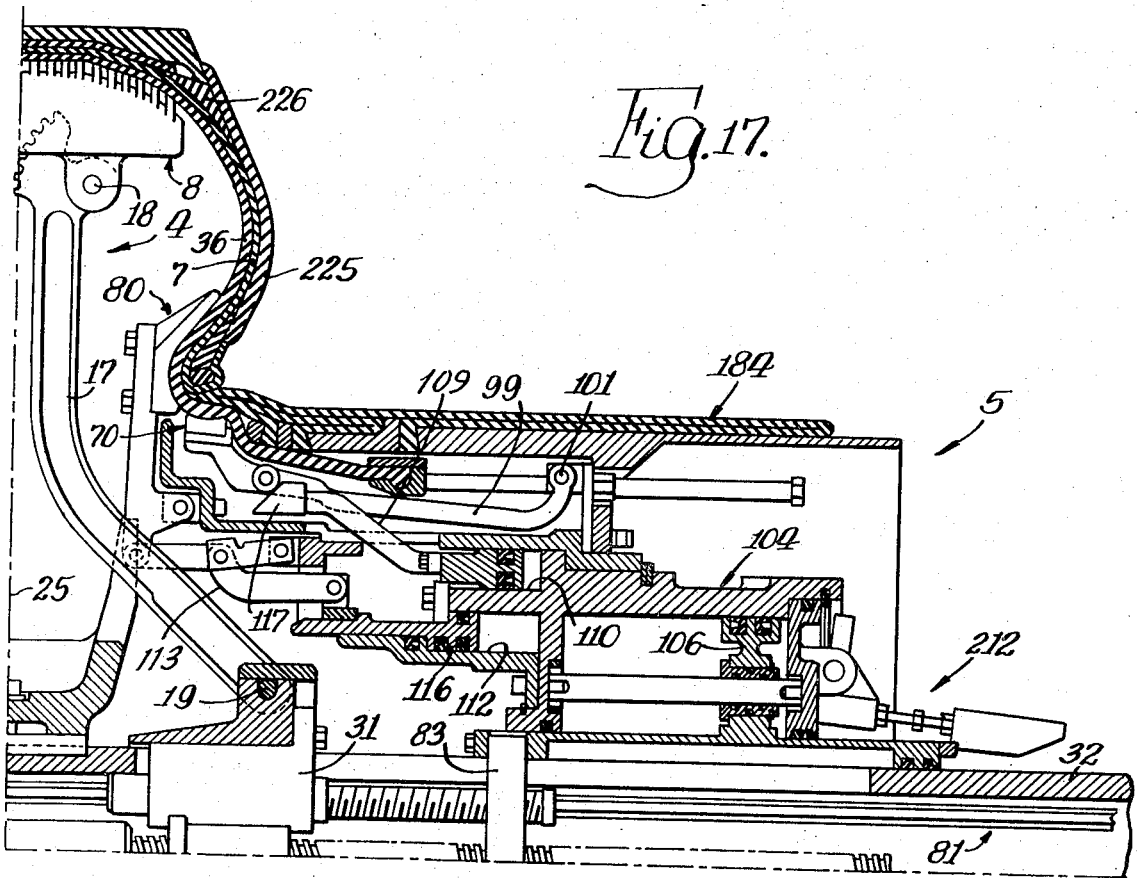
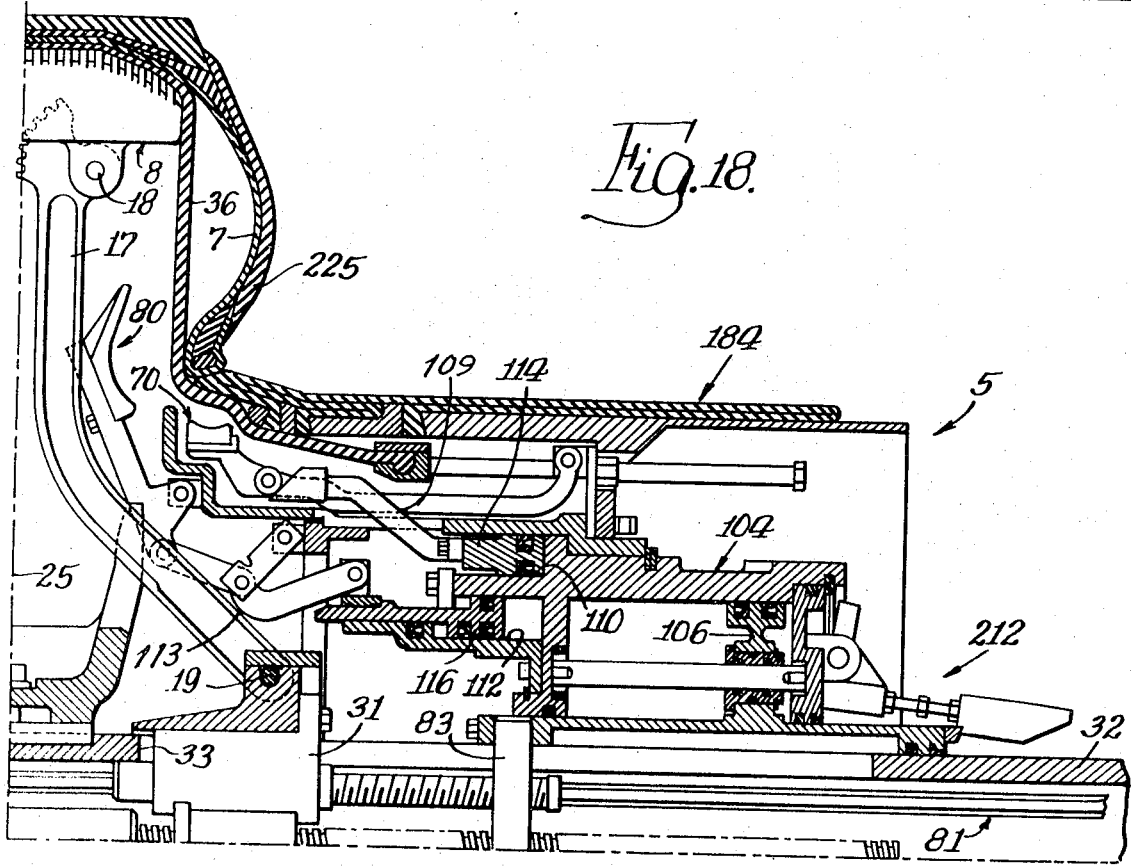

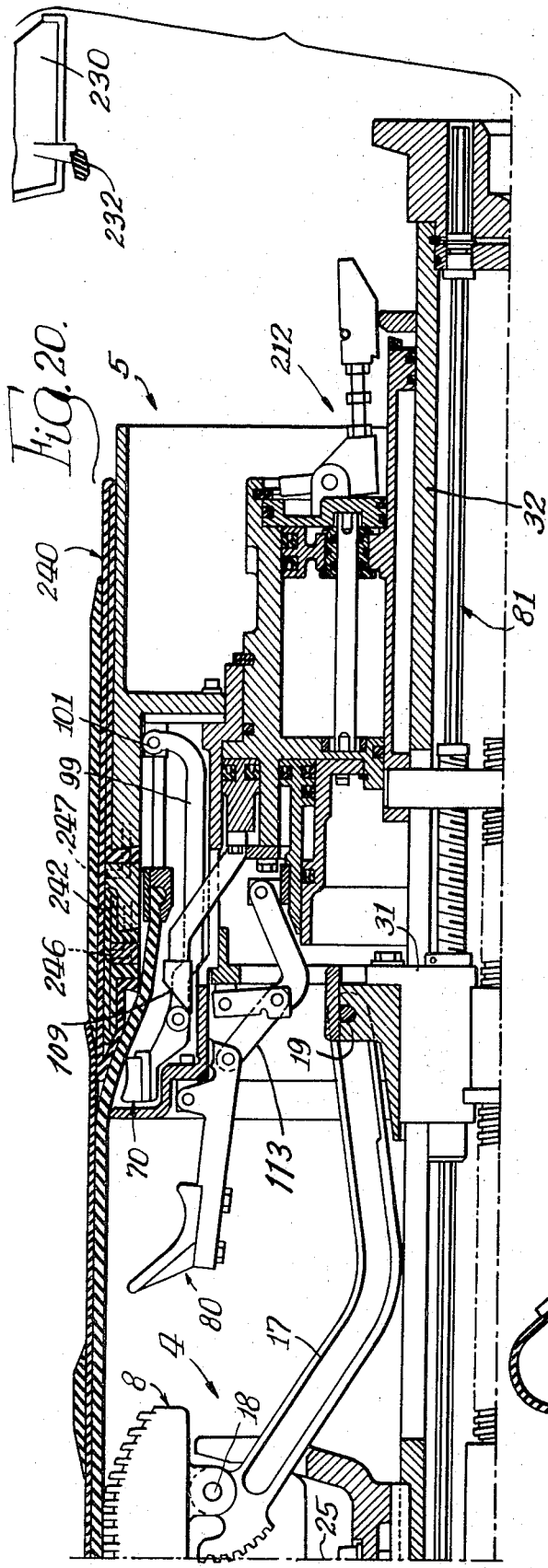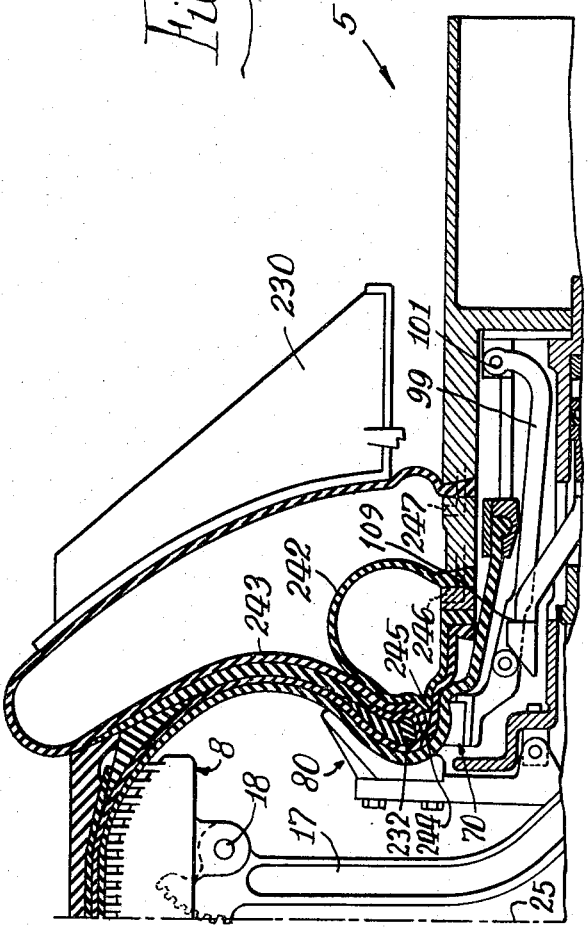

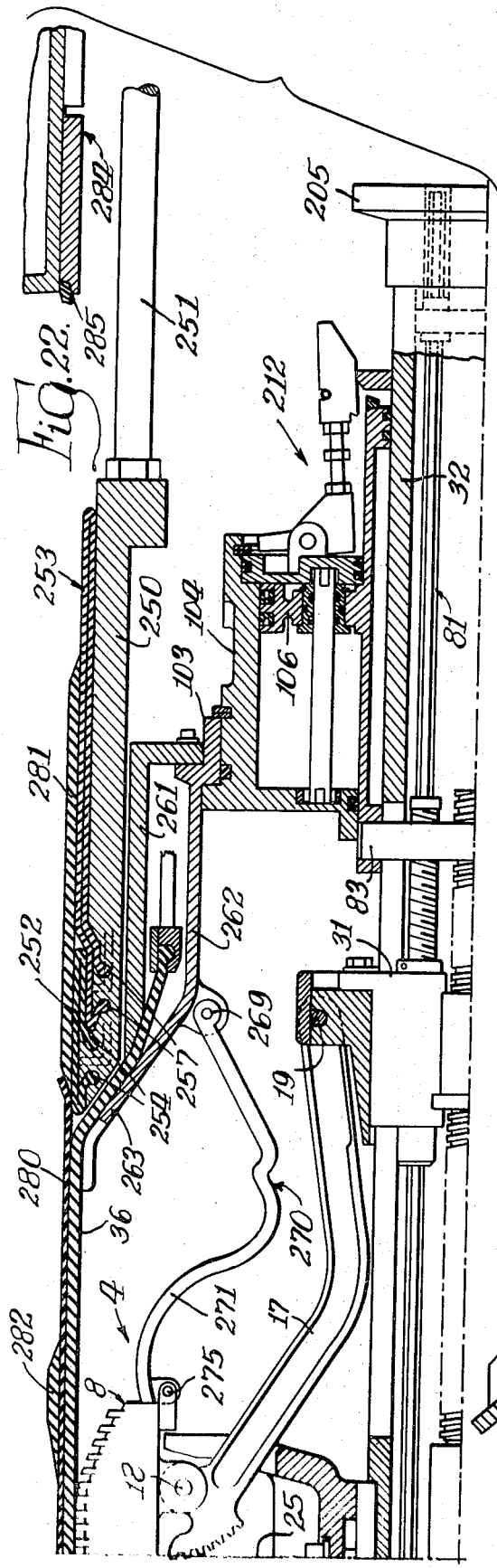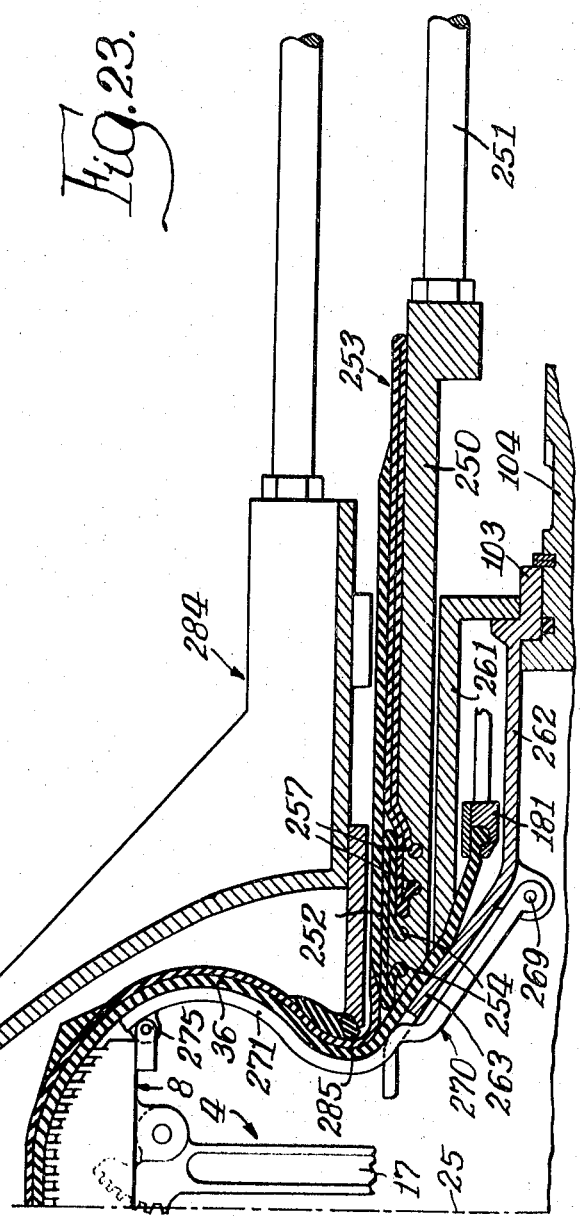

TIRE BUILDING APPARATUS FOR BUILDING TIRES

A method of building a pneumatic tire in which tire carcass material is centrally displaced to form a central portion for the crown of a tire with sidewalls extending inwardly from the crown and outer end portions extending outwardly of the sidewalls reversely curving the sidewalls between the crown portion and the inner ends of the sidewalls to provide bead seats at the inner ends of the sidewalls, and the inner ends of the outer end portions of the tire carcass material, and placing tire beads at the tire bead seats, encasing the tire beads by turning up the outer end portions of the tire carcass material against the sidewall tire carcass portions. The method as aforenoted in which sidewall components are applied to the sidewalls of the tire carcass material and in which a tire tread is applied to the outer periphery of the crown of the tire carcass material to thus provide a tire carcass which is in the form or substantially the form of a cured tire in the bead area.

BACKGROUND OF THE INVENTION

It is known prior to the present invention to provide tire building apparatus comprising an intermediate drum and end drum assemblies which in starting or initial positions thereof provides a substantially cylindrical surface for supporting tire carcass material in the form of a cylinder thereon. The intermediate drum may, for example, be of a construction embodying a plurality of circumferentially arranged deck segments each of which includes a plurality of supporting members or blades extending in directions circumferentially of the drum, and which are in end-to-end interleaved relation between adjacent deck segments so that upon the outward radial displacement of the deck segments, the outer surfaces of the supporting members or blades defining supporting surfaces of different radii or peripheral extent. Thus, after disposition of tire carcass material around the intermediate drum and with the end assemblies in their initial positions, the intermediate drum may be expanded to form the tire carcass material into substantially truncated torroidal configuration for the application, for example, of breaker and tread components to the crown portion of the tire carcass. Alternatively, as is also known, breaker and tread components may be supported outwardly of the intermediate drum assembly so that upon radial expansion of the intermediate drum assembly the tire carcass material therearound is expanded and pressed against the breaker and tread components so supported. The supporting members or blades of the deck segments in the positions last noted provide a firm surface of desired peripheral extent supporting the tire carcass material enabling components such as breakers and tread components to be well stitched to the tire carcass.

A known tire building machine of the character noted has utility for building a tire carcass with tire beads of a given predetermined diameter over a range of axially spaced apart relationship with respect to each other.

Also it is known in a general way to associate inflatable ply turn-up bag means and pusher means therefor to apply tire sidewall components to the sidewall portions of the formed tire carcass material.

There is also disclosed in our earlier application, Ser. No. 173,769, filed Aug. 23, 1971, tire building apparatus of the aforenoted character in which all components of the formed tire carcass, such as the outer periphery of the formed tire carcass and the tire beads, are all in true concentric and axially spaced apart relation.

Additionally, the application last noted discloses tire bead supporting and locking means at the inner ends of the end drum assemblies which, in operative position, lock, in axially spaced apart relation and concentrically of the longitudinal axis of the apparatus, the outer ends of the tire carcass material together with the tire beads thereat. Additionally, the aforementioned application discloses the provision of inflatable ply turn-up bag means carried by each of the end drum assemblies, the inner ends of which in the operative position of the bead supporting and locking means clamp the outer ends of the tire carcass material together with the tire beads thereat.

Also, the foregoing application discloses means to introduce fluid under pressure internally of the apparatus to provide a reaction force for the application of the sidewall components to the sides of the tire carcass material by the inflatable ply turn-up bag means and pusher means when the tire carcass material has been formed into substantially torus configuration.

THE INVENTION

According to the present invention it employs a tire building apparatus and method, as aforenoted, for forming tire carcass material with a crown portion and generally radially inwardly reversely curved sidewall portions having bead seats lying axially inwardly of the curved sidewall portions at the inward ends of the sidewalls for receiving tire beads. The tire carcass material has outer end portions extending outwardly from the bead seats which are displaced to form ply turn-ups to encase the tire beads and which are applied against curved sidewall portions. Thereafter, if desired, sidewall components for the tire may be applied to the sidewall tire carcass portions. As noted tread means such as a breaker and tire tread may be applied as by stitching to the outer periphery of the crown portion of the tire carcass material. In a tire carcass thus formed there is no rotation of the tire beads nor is the material of the ply turn-ups caused to be crimped or distorted in any manner. Thus the tire carcass material formed in the manner noted may be of the exact form or substantially of the form of a completed or cured tire at the bead area with the result that little or no distortion occurs when the tire carcass is placed in a curing press for curing the components of the tire carcass. To this end the first inflatable bag means, for example, may be employed for forming the ply turn-ups, and second inflatable bag means, for example, may be employed to apply sidewalls to the sidewall portions of the tire carcass material. If desired, dual inflatable bag means may be employed for the purpose comprising tire bead ply turn-up bag means adapted, when inflated, to turn up the outer ends of the tire carcass material to encase the tire beads in the carcass material. Also, the invention comprehends the provision of tire carcass material back-up means to take the reaction of the ply turn-up bag members upon inflation thereof in encasing the tire beads in the outer end portions of the tire carcass material thus providing a firm stitching surface of proper shape. Further, the invention comprehends the aforementioned inflation of the tire carcass upon expansion thereof by expanding the intermediate drum together with components of the apparatus providing for the final forming of the tire carcass material into a shape substantially, and if desired, exactly that of a cured and completed tire in the bead area.

The intermediate drum of the apparatus of the present invention provides an outer surface of desired peripheral extent concentric about the longitudinal axis for the shaping of the tire carcass material, and which together with maintaining the tire beads concentric about the longitudinal axis and with the tire beads in equidistant axially spaced relation with respect to the tire of cured tire configuration in the bead area.

DESCRIPTION OF THE DRAWINGS

FIG. 2 is a horizontal sectional view taken substantially along the line 2—2 of FIG. 1c looking in the direction indicated by the arrows;

FIG. 3 is a horizontal sectional view taken substantially along the line 3—3 of FIGS. 1b and 1c looking in the direction indicated by the arrows;

FIG. 4 is a vertical sectional view taken substantially on the line 4—4 of FIG. 14 looking in the direction indicated by the arrows but with the tire components omitted;

FIG. 5 is a vertical sectional view taken on the line 5—5 of FIG. 1a looking in the direction indicated by the arrow;

FIG. 6 is a vertical sectional view taken on the line 6—6 of FIG. 1c looking in the direction indicated by the arrow;

FIG. 7 is a vertical sectional view taken on the line 7—7 of FIG. 1c looking in the direction indicated by the arrows;

FIG. 8 is a vertical sectional view taken substantially along the line 8—8 of FIG. 14 looking in the direction indicated by the arrows with the tire components omitted and showing in full lines the intermediate drum in expanded position and in dotted lines the intermediate drum in collapsed position;

FIGS. 9 through 19 show the upper right hand quadrant of the apparatus shown in FIGS. 1b and 1c illustrating the sequence of positions of the intermediate drum assembly and the right hand end drum assembly in fabricating a tire;

FIG. 20 is a partial section of view of a second embodiment of the invention in which a portion of the upper right hand quadrant of a modified arrangement of ply bag turn-up means and sidewall bag applicator means, which are independent of each other, are shown;

FIG. 21 is a view of the structure of FIG. 20 showing the ply turn-up bag means and the sidewall bag means inflated in making a ply turn-up and applying a sidewall to a sidewall portion of a tire carcass conforming to the configuration of a completed tire in a manner as shown in all substantial respects as in FIGS. 1 through 18;

FIG. 22 is a partial sectional view of a third embodiment of the invention also embodying ply turn-up bag means and sidewall bag means, which are independent of each other, in an arrangement wherein the bag means are mounted on suitable supporting structure rather than on the end drum assemblies of the first described embodiment, in which the supporting structure does not embody the tire bead and inflatable drum locking means of the first described embodiment, and in which back-up means are provided for forming reversely curved sidewalls for the tire carcass; and FIGS. 23 through 25 are sequential views of the operation of the apparatus of FIG. 22 for encasing tire beads in the tire carcass material and for applying a sidewall component to the sidewall portion of a tire carcass.

DESCRIPTION OF A FIRST EMBODIMENT OF THE INVENTION

Figure 1A:
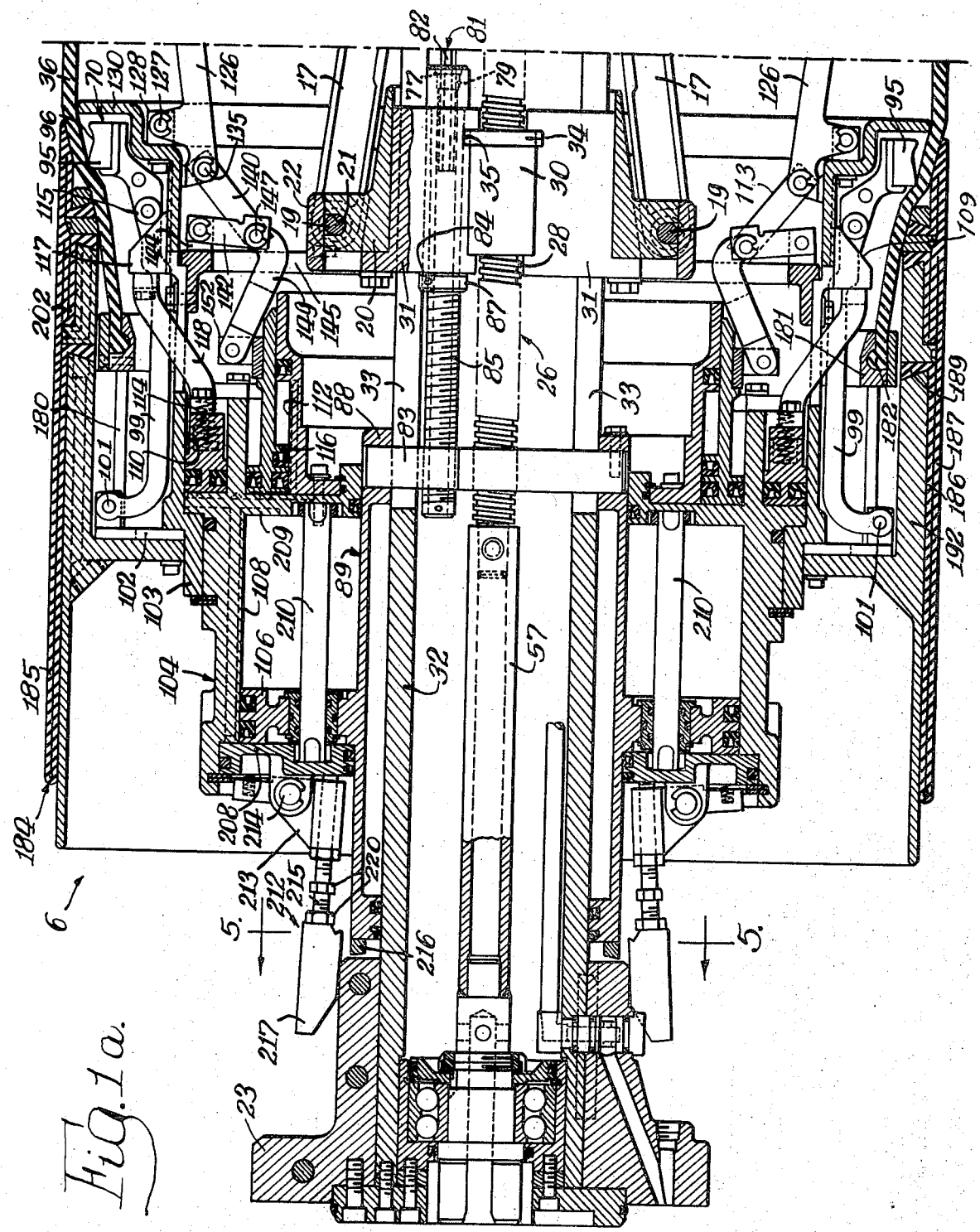
FIGS. 1a, 1b and 1c joined in end-to-end sequential relation on the dotted end lines show a longitudinal sectional view of a tire building apparatus according to the present invention with the parts in position for supporting tire carcass material and other tire components for a radial type tire construction.
Figure 1B:
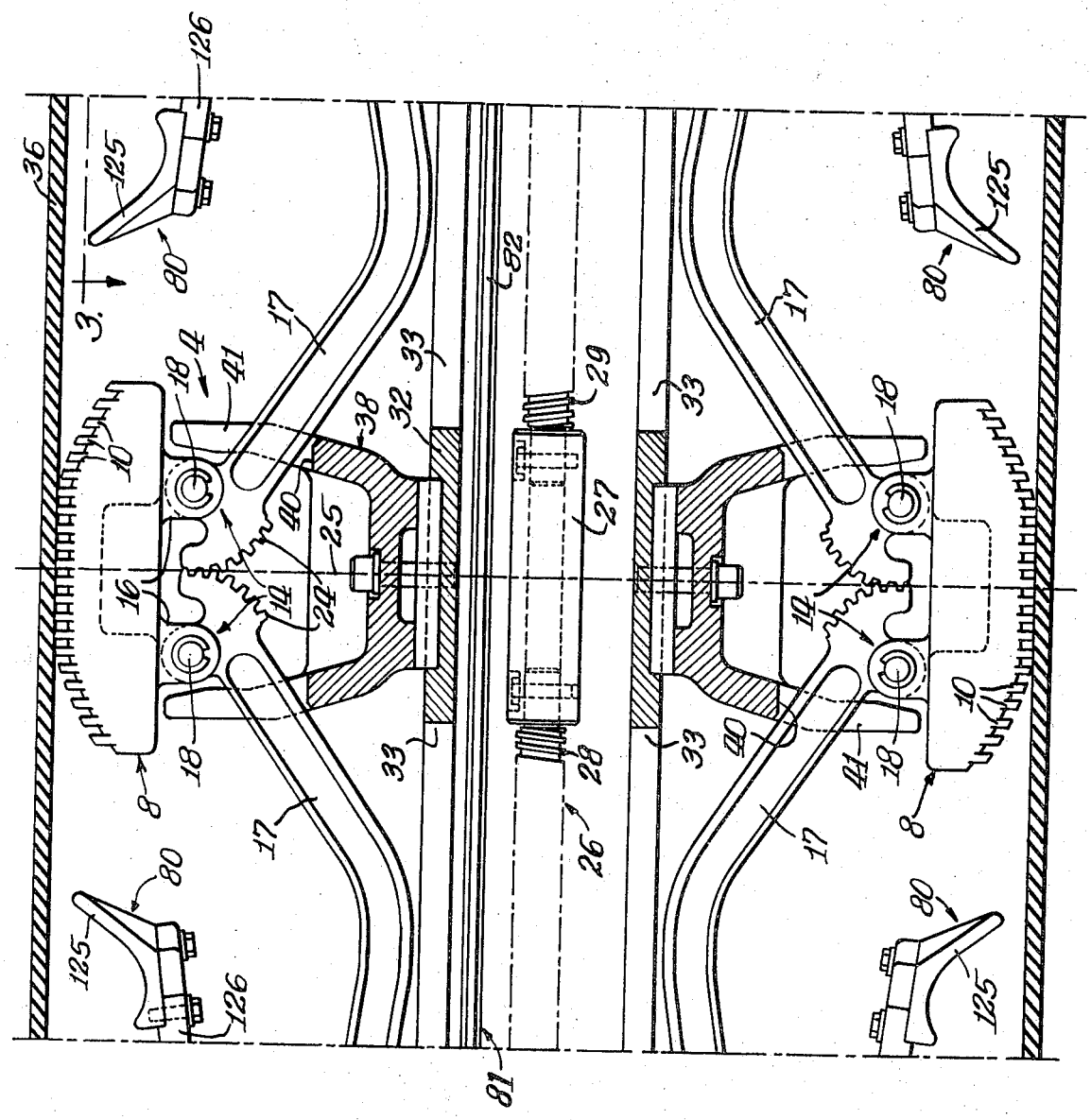
Figure 1C:
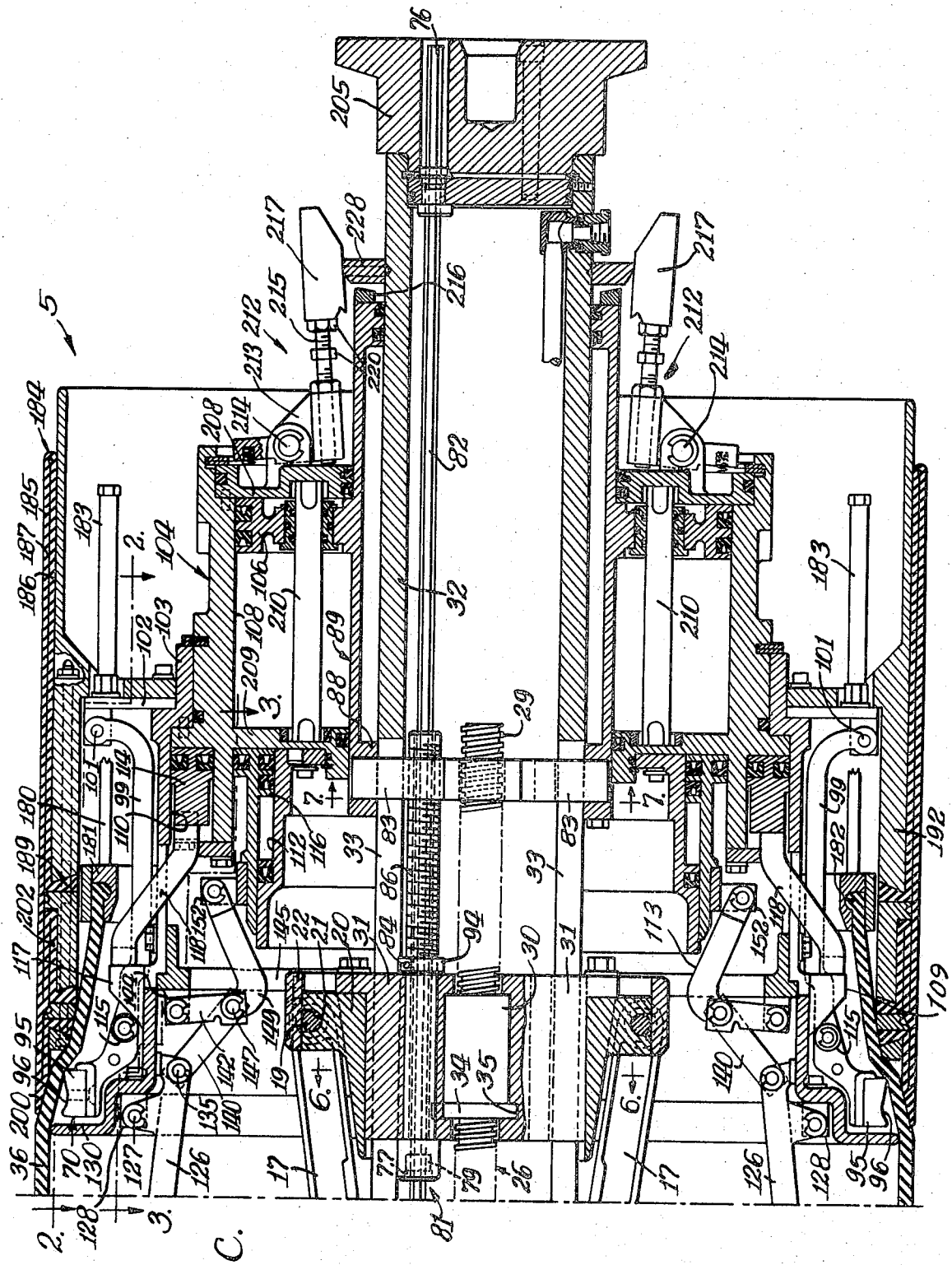

Referring now to FIGS. 1a, 1b and 1c of the drawings the tire building apparatus there shown comprises an intermediate expandable drum assembly 4 and end drum assemblies 5 and 6 respectively.

The intermediate expandable drum assembly 4 as best seen in FIGS. 1a, 1b and 1c is of a construction similar to that of our above identified application and to which reference may be had.

The drum assembly 4 comprises a plurality of circumferentially arranged platforms or deck segments 8. Each deck segment may typically include a plurality of supporting members or blades 10, as best seen in FIG. 8, extending circumferentially of the drum 4 and spaced apart in side-by-side relation in which they are in end-to-end interleaved relation between adjacent drum sections 8. In the fully expanded position of the expandable drum assembly 4, as best seen in full lines in FIG. 8, the adjacent end portion 12 of adjacent blades 10 preferably remain interleaved. Also as is known, the width of the deck segments 8 may be determined by the addition or subtraction of supporting members 10.

Figure 13:
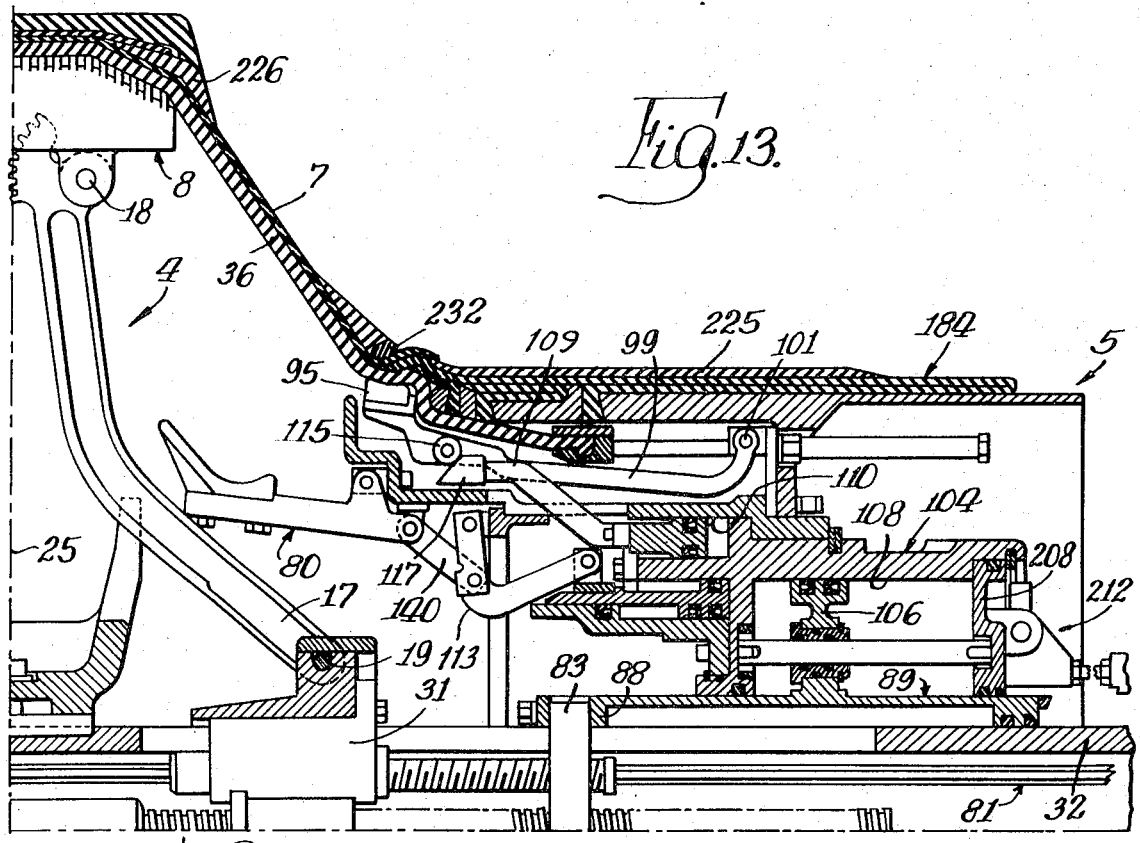

As best seen in FIGS. 1b and 8 the supporting members 10 are provided with outer circumferentially extending supporting surfaces, convex in the circumferential direction, with the inner or center supporting members 10 being of substantially uniform diameter, and the end supporting members 10 extending axially outwardly and away from the inner supporting members being of gradually diminishing diameters so that in the fully extended position of the intermediate drum assembly, as best seen in FIG. 13, the several supporting members 10 define a crown-shaped circumferentially extending supporting surface conforming to the crown shape of a conventional tire inwardly of the breaker and tread component of a conventional completed tire. Referring again to FIGS. 1a, 1b and 1c each deck segment 8 is formed with a bifurcated bracket 14 having radially inwardly extending opposed arm portions 16 between which the inner ends of pusher arms 17 are pivotally mounted as at 18. The pusher arms 17 lie in planes extending axially of the intermediate assembly 4, and at their outer ends are pivotally mounted as at 19 in axially spaced apart pusher means, such as pusher rings 20.

As shown the pusher rings 20 are formed with transversely extending substantially annular sockets 21 receiving the pivot pins 19, which pivot pins are retained in the sockets by retaining members 22 suitably secured to the pusher rings 20. The pusher arms 17 adjacent their inner ends are provided with identical meshing gear teeth 24 on the transverse centerline 25 of the intermediate drum assembly 4 perpendicular to the axis of the pusher rings 20.

The foregoing bracket 14, pusher arms 17, pusher rings 20 and associated components, together with hollow outer shaft means 32 within which inner shaft means 26 is arranged define, in part, intermediate drum expanding and contracting means. In the intermediate drum expanding and contracting means shown in the drawings the inner shaft means 26 is formed with left and right hand threaded shaft sections 28 and 29 respectively, joined by collar 27 at their opposed inner ends for keying the two shafts together for conjoint rotation. Ball nuts 30 have threaded engagement with the threaded portion of each of the shafts 28 and 29, each of which carries diametrically opposed ball nut adapters 31 which extend through axially extending slots 33 disposed in diametrically opposed relation in hollow shaft means 32. The ball nut adapters 31 have the pusher ring means 20 secured thereto by end members 34 having, as seen in FIGS. 1a and 1b, cut-outs 35 within which the ends of the ball nut adapters 31 are received. Mounted centrally of the hollow shaft means 32 is a guide block means 38, as seen in FIG. 1b, comprising a hub and slotted end flange members 41 at opposite ends of the hub of the guide block means. The guide block means 38 is provided with slots 40 which serve to guide or prevent circumferential movement of the adjacent outer portions of the pusher arms 17 in operation of the apparatus.

As before indicated FIGS. 1a, 1b and 1c show the position of the parts in the initial or starting position for forming tire carcass material, shown at 7 in FIGS. 9 through 19, mounted on an elastic drum sleeve 36 extending between the inner ends of drum assemblies 5 and 6 into the shape of a completed tire. In the initial position of the parts, the inner screw means 26 has been suitably rotated by drive means including, in part, shaft means 57 extending axially outwardly of the left hand drum 6 of FIG. 1a and including end components, including bearing means, for rotationally supporting and driving the same in end flange member 23 to dispose the pusher rings 20 to their axially outermost positions with respect to each other.

Figure 14:
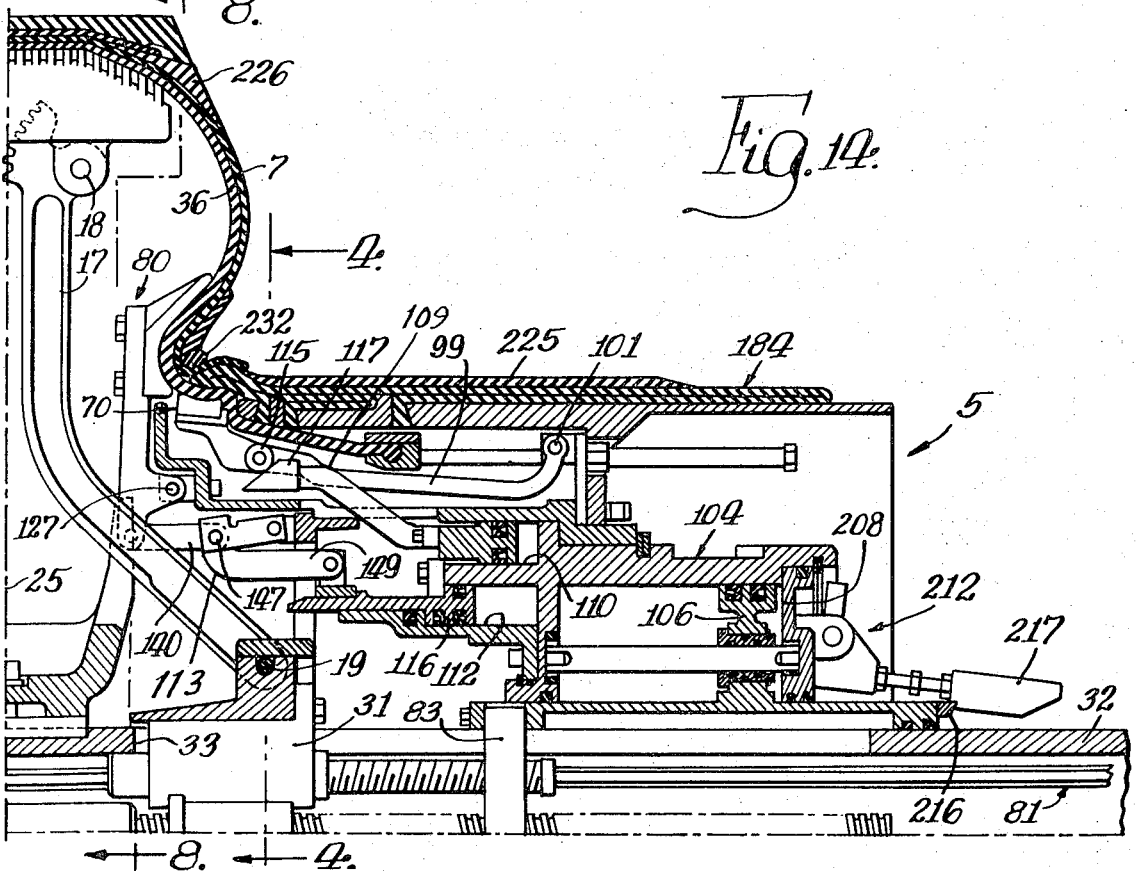

After placement of the tire carcass material in position as noted in connection with FIGS. 1a, 1b and 1c, the inner shaft means 26 is rotated to effect conjoint axial inward movement of the pusher rings 20 toward each other and at the same rate in which the meshing engagement of the gear teeth 24 radially expand the intermediate drum assembly to a position for progressively forming the intermediate portion of tire carcass material 7 and the drum sleeve 36 to a torus configuration as seen in FIG. 13, and in the end positions thereof the tire carcass material 7, by means to be described, is in the true form of a completed tire as seen in FIG. 14, and at which the supporting members or blades 10 have moved radially and circumferentially relative to each other to provide a supporting surface for the intermediate drum assembly for the stitching of tread means such as a breaker and tread cap as, for instance, by conventional stitching wheels or otherwise as aforedescribed. The expansion of the intermediate drum assembly may be to the maximum position as aforenoted, but if a tire of smaller diameter is desired the relative radial and circumferential movement of the supporting members 10 may be stopped at any desired radial position for forming cylindrical surfaces of different radii or peripheral extent for a desired diameter of a tire.

It will be observed that the slots 40 of the guide block means 38 and the radially outwardly slotted end flange members 41 prevent substantial circumferential movement of the guide arms 17 and add rigidity to the drum construction in a circumferential direction. The mesh of the gear teeth 24 in the position of the parts as shown in FIGS. 1a, 1b and 1c rigidly and accurately disposed the deck segments 8 with respect to each other so that the supporting members 10 define and act as a supporting surface of desired peripheral extent and symmetrical about the longitudinal axis of the drum for the tire carcass material. With the intermediate portion of the drum expanded to its outermost position, sidewalls in a manner to be described may be placed upon opposite sides of the expanded tire carcass.

In the specific illustrated form of the intermediate expandable drum 4 it should be noted that the gear teeth 24 are constantly in mesh, and as the deck segments 8 are consequently forced an equal distance radially outwardly on the axis 25 perpendicular to the axis of the pusher means 20, whereby the deck segments 8 remain substantially equidistant to the axis of the intermediate expandable drum 4. The gear teeth 24 are so developed so as to maintain the deck segments 8 in equidistant position resisting unequal roller pressures and also side pressures, such as are present in the application of a breaker, tread cap and/or sidewall components as may occur in conventional stitching operations.

Also in the intermediate drum assembly shown in the drawings, the guide slots 40 in the guide block means 38 and arms 41 serve as torsion guiding members for the pusher arms 17 and through them for the deck segments when it is desired to effect rotation of the intermediate assembly as, for example, in the stitching of tread means such as a breaker and tread cap to the outer center periphery of the tire carcass material 7. The inner portion of FIG. 8 shows in dotted lines the intermediate drum assembly 4 in collapsed position to which it is returned after completion of the assembly of components for a tire with the geometry being such that the intermediate drum 4 and components at the inner ends of the drum assemblies 5 and 6 collapse together with the elastic drum sleeve 36 to enable removal of the completed assembly of tire components from an end of the apparatus upon completion or retraction of the parts at the inner ends of the drum assemblies 5 and 6 to the position shown in FIGS. 1a, 1b and 1c.

A predetermined axially spaced apart position of a pair of bead supporting and locking means 70 and bead back-up supporting means 80 at the inner ends of the end drum assemblies 5 and 6 is achieved by the provision of carrier adjusting means 81 comprising a continuous hex shaped shaft 82 extending through the ball nut adapters 31. The hex shaft 82 may be rotated by hex nut means 76 extending outwardly beyond the outer end of the end drum 5. Threaded sleeves 85 and 86 extend through ball nut adapters 31 and have oppositely threaded axially outwardly extending pin engaging means for threaded engagement with the inner ends of radially outwardly extending pins 83 for axial movement in slots 33 of shaft means 32.

As noted the shaft 82 is hex shape in cross-section throughout its entire length and the screws 85 and 86 have a bore therethrough through which the shaft 82 extends in nonengaging relation. The screws 85 and 86 at their axial inner ends are provided with integral collar ends 77 into which a hex insert 79 is rigidly fixed to the collars 77. The hex inserts 79 have a short hex bore corresponding to the crosssectional configuration of the hex shaft 82. The nuts shown at 87 and 94 are adjusted along screws 85 and 86 to minimize end play between the screws 85 and 86 and the ball nut adapters 31 in conjunction with the collar ends 77 of the screws 85 and 86. The ball nut adapters preferably each have a bore sufficiently large for a slip fit over the threads of the screws 85 and 86. Once adjusted a lock pin 84 is inserted into each of the nuts 87 and 94 in fixed position on the screws 85 and 86 respectively. In assembling the components, the hex shaft 82 is inserted initially only through screw 86 and turned until the end assemblies 5 and 6 are equidistant from the intermediate transverse centerline 25 of the drum. The shaft 82 is then axially advanced on through screw 85, and any further rotation of the hex shaft 82 will cause equal movement and maintain the equidistance of the end drum assemblies from the transverse median centerline of the drum. Rotation of the hex shaft 82 causes axial motion of the pins 83 with respect to the ball nut adapters 31 which have previously been centered. This effects the adjustment of toe-to-toe for the tire carcass leaving the intermediate drum assembly unaffected. The hex headed shaft 82 when rotated by rotation of hex nut 76 effects equal movement of the pins 83 axially inwardly and outwardly with respect to the transverse centerline 25 of the intermediate drum 4. As the pins 83 are adjusted equidistant about the vertical centerline 25 of the intermediate drum 4, the pusher rings 20 are always equidistant of the vertical centerline 25 of the intermediate drum in any axially spaced apart relationship of the ball nut adapters 31 with respect to each other.

As shown, the pins 83 are mounted with the outer ends extending radially within and in engagement with bores therefor in flange means 88 of the carrier means 89 mounted for relative axial sliding movement on the outer ends of shaft means 32. Thus the carrier means 89 are mounted for adjustable relative axial sliding movement on the shaft means 32 to fixed adjusted positions equidistant to the transverse centerline of intermediate drum 4 by reason of the shaft means being slotted as at 33 to provide for the aforementioned predetermined axial positioning of pins 83 in both end drum assemblies.

As the ball nuts 30 and pusher rings 20 are axially driven toward and away from the vertical centerline 25 of the drum to operate the expansion and contraction of the intermediate drum assembly 4, the carrier means 89 move toward and away from each other on the outer ends of the shaft means 32. However, as noted by the use of right and left hand adjusting screws 85 and 86, the carrier means 89 may be axially adjusted on shaft means 32. Thus it will be readily appreciated that by adjusting the carrier means 89 axially outwardly on shaft means 32 the effect will be to increase the bead set dimension of the bead supporting and locking means 70 and tire bead backup means 80 for the drum.

The bead supporting and locking means 70 comprise a plurality of circumferentially arranged clamping members 95 having concave or other suitable surfaces 96. The clamping members 95 are carried at the outer ends of lever arms 99 pivotally mounted at their opposite ends, as at 101, to bracket members 102 fixed to a cylinder sleeve 103 which in turn is made fast to ply tensioning means 104 surrounding and axially movable with and relative to the carrier means 89.

The aforementioned carrier means 89 intermediate its ends supports a piston 106 disposed within ply tension cylinder 108 of the ply tensioning means 104. Fluid pressure admission and release ports at opposite ends of piston 106 are diagrammatically shown at 107 and 111 respectively, as shown in FIG. 9. Also, the ply tensioning cylinders 108 at their inner ends have locating means 109 for tire bead supporting and locking means including cylinder means as at 110, and positioning means 113 for the tire bead back-up means 80 including cylinder means as at 112. Piston means 114 and 116 are provided, respectively, for the cylinders 110 and 112. Fluid pressure admission and release ports opening into the closed ends of cylinders 110 and 112 are diagrammatically shown at 110' and 112' respectively. The aforementioned locating means 109 comprises cam followers 115 at the inner ends of lever arms on 99 adapted to be engaged by cam members 117 carried at the inner ends of arms 118 which are connected at their outer ends to piston means 114, which upon axial inward movement engage the cam members 117 to dispose the tire bead supporting and locking means 70 from their inoperative positions, as shown in FIGS. 1a and 1c to their operative positions as seen in FIG. 11, for purposes to be described.

The back-up means 80, in the embodiment of the invention shown in the drawings and as seen in FIGS. 3, 9 and 10, comprises a plurality of circumferentially arranged back-up shoes 125 carried at the inner ends of arm members 126 which are pivoted intermediate their inner ends, as at 127, to bracket members 128 which are fixed to the inner ends of the axially extending cylinder members 103. The axial inner ends of the cylinder members 103 are also formed with radially outwardly extending shoulders or seats 130 within which the tire bead supporting and locking means 70 in the inoperative positions thereof, are received. Upon reference to FIG. 9 it will be seen that the axial outer ends of the lever members 126 are pivotally connected, as at 135, to links 140 of positioning means 113 which (see FIG. 10) are connected at their opposite ends to links 142 and 149 as at pins 147. Links 142 are pivotally connected at their outer ends to bracket members 144 secured to transverse frame members 145. Links 149 as indicated in FIG. 1c are further pivotally connected at their ends to axially outward bracket members 152 fixed to piston means 116 of bead back-up cylinder means 112. In the retracted position of the back-up piston means 116, shown in FIGS. 1a, 1b and 1c, the tire bead back-up shoes are in their inoperative position and upon admission of fluid under pressure in the cylinder means 116 between its closed end through ports 112', as seen in FIG. 9, in any known or conventional manner, the bead back-up shoes of the mechanism described are moved to their operative position, as best shown in FIG. 14.

Suitable seals are provided for several cylinder means above described to prevent escape or leakage of fluid therefrom. Also, suitable fluid pressure inlet and outlet connections and control valves for the several cylinder means are provided, as is well within the skill of the art, and hence the inlet and outlet fluid admission and bleed ports are only shown diagrammatically.

The sleeve 36, previously mentioned, if desired may have embedded therein steel wire or other material of high tensile strength to prevent elongation of the sleeve in the successive formation of tire carcass materials supported on the sleeve into its ultimate configuration.

It will be seen again upon reference to FIG. 1c that the sleeve 36 at its opposite ends is secured in position by threaded studs 180 which, at their inner ends, are secured to end ring means 181 in which enlarged annular end portions 182 of the sleeve 36 are mounted. The right hand stud 180, as shown in FIG. 1c, has threaded engagement with the threaded adjusting sleeve 183 for adjusting the axially spaced apart positions of the ring members 181 for purposes of tensioning the sleeve 36.

Each end drum assembly provides for the support of an inflatable bag means 184. Each bag means is of dual envelope configuration and comprises sidewall inflatable applicator bag means 185 having layers of rubber as shown at 186 and 187 respectively, which, if desirable, may also be axially reinforced by steel wires or other material of high tensional strength. At the outer ends of the sidewall inflatable applicator bag means the inner layers 186 are formed with truncated portions 189 having a snug fit with correspondingly formed grooves in annular end drum frame members 192 which encase the aforedescribed anchoring means for the elastic sleeve 36 and the various components previously described in each of the end drum assemblies. The truncated portions 189 are suitably ported in any suitable manner for admitting fluid under pressure into the inflatable low pressure sidewall applicator bag means 185 to effect inflation of the same and also for release of fluid under pressure for deflation of the sidewall applicator bag means. Also it will be seen in FIG. 9 that the innermost ends of the inflatable bag means 184 are tapered, as at 200, and are adapted to lie between the portions of the elastic sleeve 36 inwardly of end drum assemblies and between tire carcass material at the positions at which tire beads are adapted to be located prior to forming the tire carcass material into torus configuration.

The bag means 184 further comprises high pressure ply turn-up bag means 202 located axially outwardly of the tapered ends 200 and lying inwardly within the sidewall applicator bag means 185. Suitable port means is provided for admitting fluid under pressure into ply turn-up bag means 202 and the release of pressure therefrom in operation of the apparatus as will be described.

Suitable seals are provided through the end drum assemblies so as to provide a closed interior chamber for the apparatus into which fluid under pressure is adapted to be admitted and released. As will be seen the right hand end of shaft means 32 is provided with an end plug 205 and seals for closing off the right hand end of the quill shaft 32. The aforementioned mounting means for quill shaft 32 mounted in collar 23 and seals thereat provide for closing off the left end of shaft means 32.

Referring now to FIGS. 1a and 1c it will be seen that the cylinders of ply tensioning means 104 are closed at their outer ends by end cap members 208 and between which, and the inner ends 209 of the ply tensioning cylinders, drive rods 210 extend between and have flatted end portions engaging in slots in end cap members 208 and the inner ends 209 of the ply tensioning cylinders to prevent radial rotation of the components during application of tire carcass material and stitching operations.

Stroke limiting means 212 comprise bracket members 213 pivoted as at 214 on the end cap members 208 from which threaded studs 215 extend axially outwardly and carry abutment members 217 having shoulders for engaging the outer ends 216 of carrier means 89. Camming means defined by an annular ring 228 is shown in FIG. 1c and the inner end of collar 23 in FIG. 1a, disposed axially outwardly of the outer ends of the carrier means 89, are adapted to engage abutment members 217 to raise the shoulders over to positions in which they will not engage the outer ends 216 of carrier means 89 in the collapsed position of the intermediate drum means 4. Adjusting and lock nut means 220 associated with threaded studs 215 provide for adjusting and locking the position of the stroke limiting means 212 to the desired positions.

It will be understood that the foregoing apparatus is provided with conventional bead placer and pusher ring means which will be shown and described in the following description concerning the operation of the above described apparatus.

OPERATION OF THE AFOREDESCRIBED APPARATUS

Referring now to FIGS. 1a, 1b, 1c and FIG. 9 the several parts are in their initial starting positions in which the bead supporting and locking means 70 and the tire bead back-up means 80 have been adjusted, as before described, to a desired position equidistant of the vertical median axis 25 of the intermediate drum assembly 4. The bead supporting and locking means 70 and the tire bead back-up means 80 are disposed in their inner radial inoperative positions. The location of the bead supporting and locking means 70, which determine the periphery of the tire, depends upon: (1) the position of the ball nut adapters 31 which stop at a given point when a limit switch (not shown) is hit during contraction of the drum, (2) the relative position of pins 83 and therefore sleeve 89 and piston 106 to the ball nut adapters 31 as determined by adjustment of hex shaft 82, and (3) air being under pressure to the axially inner hand side of piston 106 for holding the piston 106 against the end cap 208. Thus in the position of the parts of FIG. 9 the tire carcass material 7 is applied over the intermediate drum assembly 4 and side wall components 225 are disposed upon the outer surfaces of the inflatable bag means 184 with the inner peripheral edges of the sidewalls 225 being disposed inwardly of the outer end portions of the tire carcass material 7 and the inner tapered end portions of the inflatable bag means 184 being disposed upon the carcass material to lie radially outwardly of the tire bead supporting and locking means 70. Other components, such as tread ply inserts as at 226, desired for the tire carcass material may also be assembled with the parts of the apparatus in the position shown in FIGS. 1a, 1b, 1c and 9.

In FIG. 9 there is a conventional tire bead placing and pusher ring means 230 having a tire bead 232 mounted therein and is moved from a position axially outwardly of the end drum assemblies to the position shown in FIG. 10 for supporting the tire bead radially outwardly of the tire bead supporting and locking means 70. It will be understood that the foregoing is also true of the end drum assembly 6, and the following description, while in part limited to end drum assembly 5, is also true of drum assembly 6.

With a tire bead 232 thus supported the tire bead supporting and locking means 70 are actuated to the position shown in FIG. 11 by appropriately admitting fluid under pressure into the cylinder means 110 which, through the components previously described, effects movement of bracket member 118, to the position shown in FIG. 11, to cause the concave inner surface 96 to engage the elastic drum sleeve 36 thereat clamping the carcass material and the inner end of the bag means 184 with tire bead 232 supported by the tire bead placing and bag turn-up means 230. Brackets 118 support cams 117 which contact rollers 115 fixed to arms 99. As the cams 117 move under rollers 115 arms 99 are caused to pivot about pivots 101 thus causing the clamping above noted. Thus in the position of FIG. 11 the tire beads are caused to be locked from inside the drum in appropriately spaced apart axial relationship, and after which the tire bead placing and bag turn-up means 230 is withdrawn to retracted position and radial expansion of the intermediate drum assembly 4 is initiated, as shown in FIG. 12. The tire beads 232 are then locked with the tire carcass material so that during the shaping operation described below the tire bead to tire bead periphery stays constant.

As shown in FIG. 12 drum expansion is initiated by rotating central screw means 26 and the tire carcass material is maintained taut by pressure being maintained in tension cylinder means 104 to the right side of stationary piston 106 and end cap 208 and maintain the periphery of the tire true and keep the materials taut as the tire carcass material is expanded.

The expansion of the intermediate drum assembly 4 is continued with pressure maintained in tension cylinder means 104, as aforedescribed, until the tire carcass material is formed into truncated torroidal configuration for application of tire breakers and tread, as shown in FIG. 13.

As seen in FIG. 14, after application of the tread means, such as a breaker and tread component, the tire carcass material is shaped to that conforming to, or substantially conforming to, that of a completed tire in which the sidewalls of the tire carcass material are reversely curved between the crown portion and the bead area with the inner ends of the sidewalls providing bead seats for the tire beads 232. The back-up means 80 serve for reversely curving the sidewalls of the tire carcass material as aforesaid between the crown of the tire carcass material and the inner ends of the side walls thereof when the pressure in tension cylinder means 104 is reversed as by admitting fluid under pressure to the left hand end of piston means 106 and bleeding the cylinder to the right of piston 106. Thus in curing of the formed carcass no compression is required in the curing press. Also the tire back-up means 80 have been positioned, by appropriate energization of cylinder means 112, to operative positions inwardly of the tire carcass material at the beads 232 so that the tire carcass material is now of a configuration conforming to or substantially conforming to that of a completed or cured tire. The inward movement of the tension cylinder means 104 has been arrested by engagement of the stroke limiting means 212 with the outer ends of the carrier means 89 to properly position the tire beads in axially spaced relation inwardly of the sidewalls of the tire carcass to true tire configuration.

Figure 15:
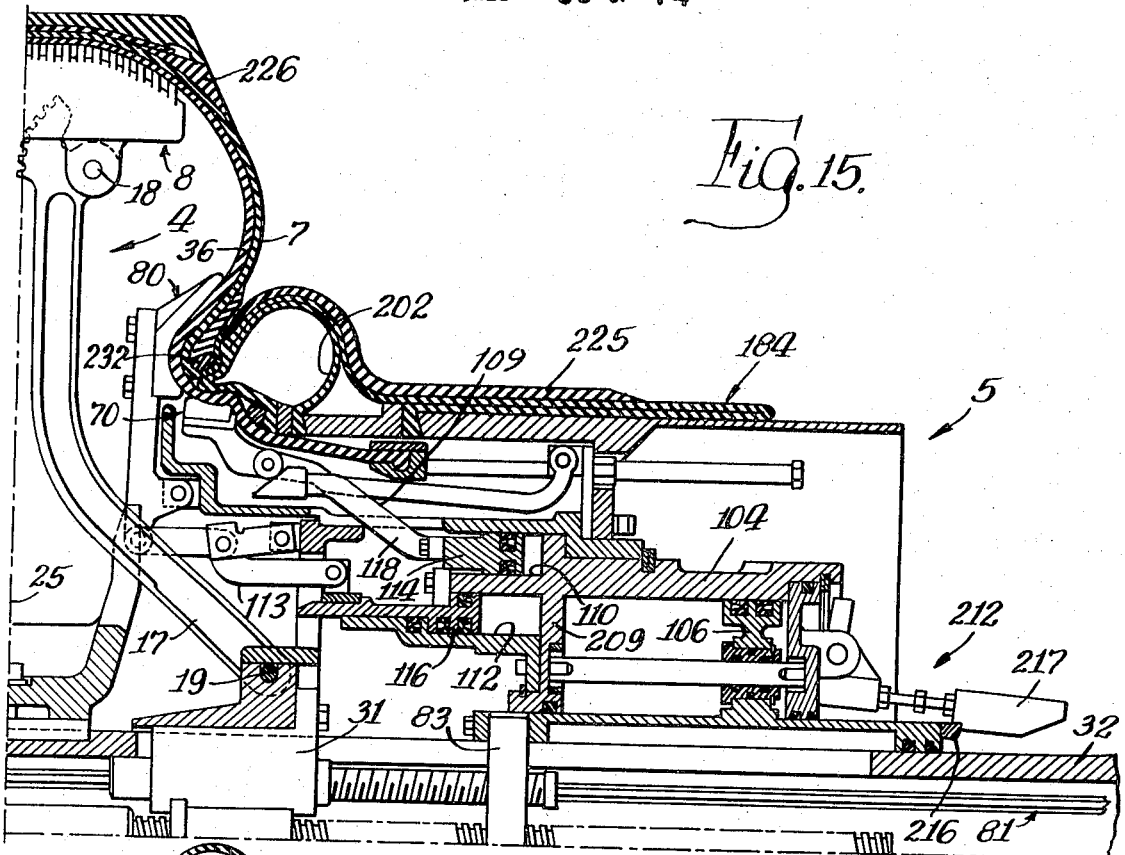

Thereafter, and as shown in FIG. 15, the high pressure ply turn-up bag means 202 have been inflated to encase tire beads 232 in opposite end portions of the tire carcass material. The whole of the interior of the apparatus, including the intermediate drum, has fluid under pressure admitted thereto to help take the reaction force of the high-pressure ply turn-up bag means and pusher means 230. During pressurizing of the apparatus the bead back-up means 80 is brought into position and air under pressure is admitted to the left hand side of piston 106 pulling member 217 against member 216 thus accurately positioning the tire beads before the ply turn-ups are made. This, along with the back-up means 80 and the internal pressure, provides the true tire shape for ply turn-up and sidewall applicator.

Figure 16:
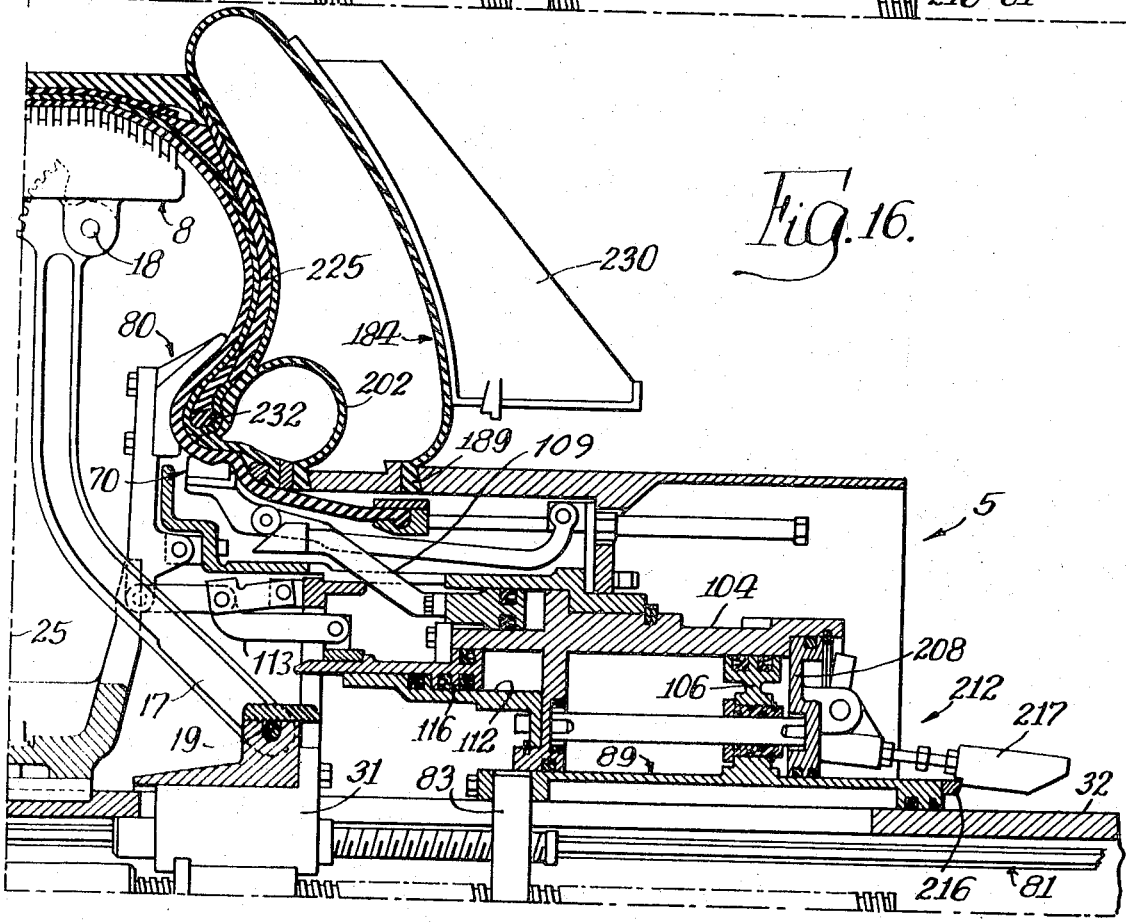
Figure 19:
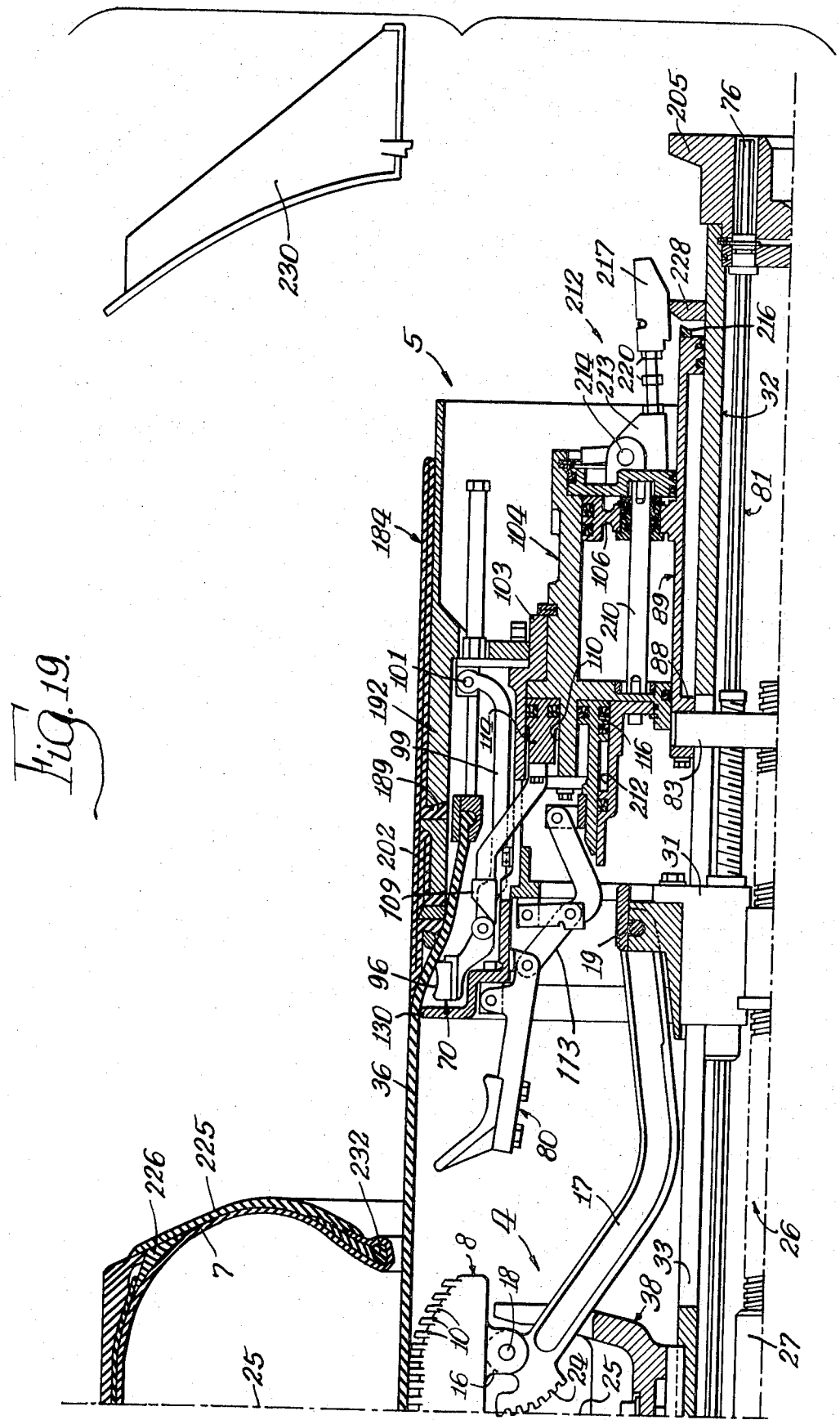

Referring now to FIG. 16 the sidewall components 225 are applied to the sidewalls of the shaped carcass material by inflating low pressure sidewall bag means and advancing the pusher means 230 toward the tire carcass so that the sidewall bag means apply the sidewall components to the tire carcass, and while the interior of the apparatus is under pressure to take the reaction of the application of the sidewall components to the tire carcass.

After application of the sidewall components and, as shown in FIG. 17, the tire bead placing and bag pusher means 230 are retracted to inoperative positions and, as shown in FIG. 17, breaker and tread components may be applied to the crown of the tire carcass material which, in the particular arrangement shown in FIG. 17, provides a sidewall over tread construction. It will be understood, however, that if desired the breaker and tread strips may be applied before application of the sidewalls and the sidewalls thereafter applied so as to provide a sidewall over tire tread construction. It will be seen that the true radial concentricity of the breaker and tread is maintained since all of the tire components are mechanically held at this point. While encasing the tire beads and the application of the side wall components, the interior of the drum apparatus is placed under pressure as by admitting fluid under pressure as, for example, through the outer end of drive shaft 57 to provide the aforenoted reaction force for the final stitching of the sidewall components to the shaped tire carcass. After application of the sidewall components the bag means 184 is deflated and returned to the position shown in FIG. 18 and return of the bead back-up and bead lock means are initiated.

After completion of the construction of a tire carcass as above described, the several parts are returned to the positions shown in FIGS. 1a, 1b, 1c and 19 to enable removal of the formed tire carcass by axially moving the same outwardly over an end of the drum assembly. Thereafter, of course, the tire may be cured in a conventional curing mold to form a completed tire. In the foregoing operation the tire beads are not forced to rotate, thus each wire of the tire beads carries an equal load and provides a highly uniform tire.

DESCRIPTION OF A SECOND EMBODIMENT OF THE INVENTION

Referring now to FIGS. 20 and 21 there is shown a modified arrangement of bag turn-up means 240 which may be embodied with the apparatus described in connection with FIGS. 1 through 19 in lieu of the aforedescribed inflatable bag means 184. Other components of the apparatus of FIGS. 20 and 21 are the same as those described in connection with the first described embodiment of the invention and it is believed need not be repeated here.

Thus as seen in FIGS. 20 and 21 there is shown a high pressure inflatable ply turn-up bag means 242 disposed as a separate component within and at the inner end of low pressure inflatable sidewall bag means 243. The high pressure turn-up bag means 242 and the sidewall applicator bag means 243, as best seen in FIG. 21, have interfitting portions as at 244 and 245 respectively, which are adapted to be clamped together with a tire bead 232 by tire bead clamping and locking means 70 as aforedescribed. Port means, diagrammatically shown at 246, provides for the inflation and deflation of the high pressure turn-up bag means 242, and port means, diagrammatically shown at 247, provides for inflation and deflation of the low pressure sidewall applicator bag means 243. The position of the parts in FIG. 21 correspond to that of the position of the parts as shown in FIG. 16 in the first described embodiment with the parts having been disposed in the position shown by means already described in connection with the first embodiment of the invention.

OPERATION OF THE SECOND EMBODIMENT OF THE INVENTION

From the foregoing description of the second embodiment of the invention it is believed that the operation of it will be readily understood by reference to the description of the operation of the first embodiment of the invention with the only difference being in the construction of the ply turnup bag means and the sidewall applicator bag means as above described.

DESCRIPTION OF A THIRD EMBODIMENT OF THE INVENTION

Referring now to FIG. 22 the right hand quadrant of another embodiment of tire building apparatus of the present invention is shown. It is believed that the apparatus will be readily clear from the showing of FIG. 22 in view of the fact that the left hand upper and lower quadrants and the right hand lower quadrant are of the construction as shown in FIG. 22. Referring again to FIG. 22 the structure there shown embodies an intermediate drum assembly 4 and expanding and contracting means as previously described in connection with the foregoing first embodiment of the invention, and it is believed it need not be repeated here for understanding of the instant embodiment of the invention.

A drum encasing sleeve 36, as aforedescribed, encases the intermediate drum and is anchored at its opposite ends in the manner described in connection with the first above described embodiment of the invention.

An annular end supporting structure 250 extends axially outwardly of the intermediate drum assembly 4 and provides for the support of high pressure inflatable ply turn-up bag means 252 and low pressure inflatable sidewall applicator bag means 253. A rod 251 is connected to the outer end of supporting structure 250 and is movable axially inwardly and outwardly by any suitable means.

Figure 25:
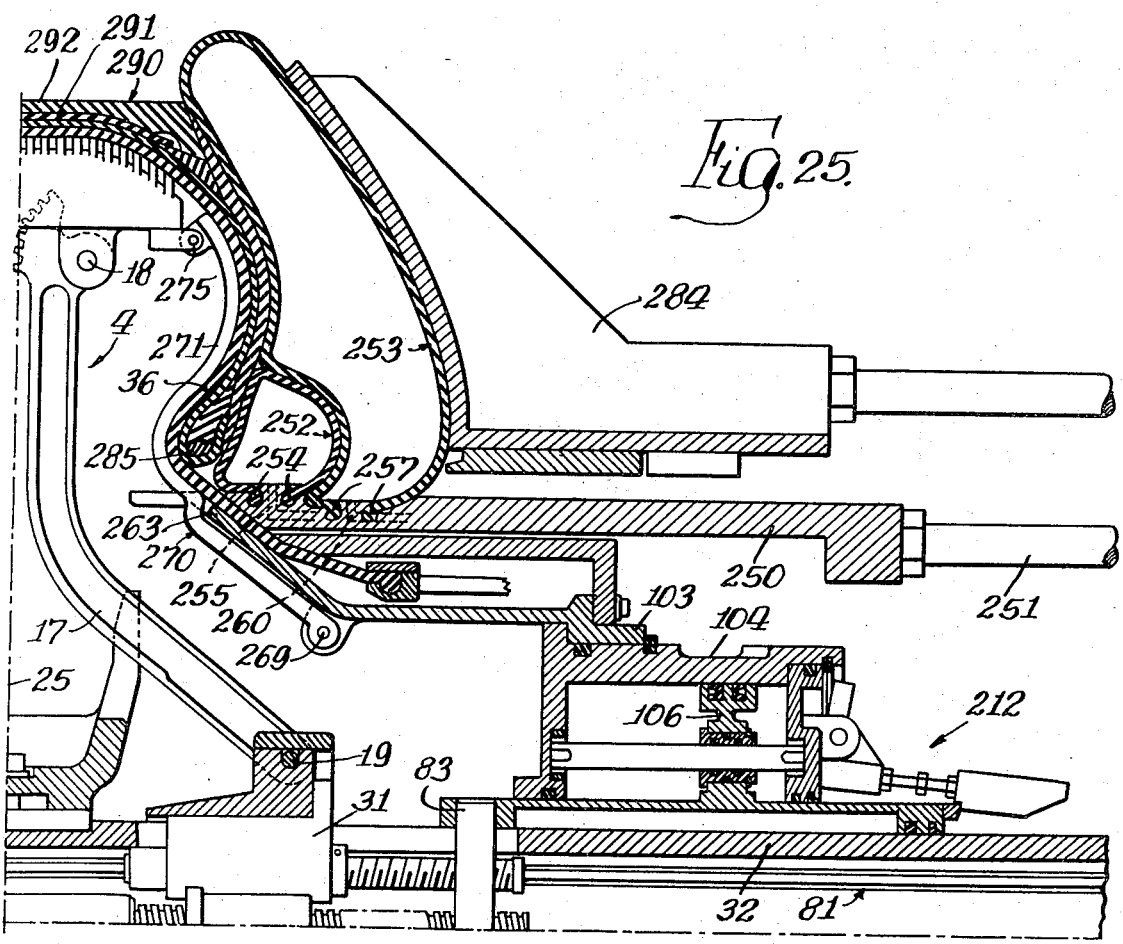

The ply turn-up bag means 252 is provided with axially spaced apart bag bead members 254—254 seated in the supporting structure 250, and port 255 provides for the admission of fluid under pressure and the release thereof from ply turn-up bag means 252. Similarly, the sidewall applicator bag means 253 is provided with axially spaced apart bag bead members 257—257 seated in the supporting structure 250, and port 260 provides for the admission of fluid under pressure and the release thereof from the sidewall applicator bag means 253. The ply turn-up bag means 252 lie axially inwardly and overlie the inner ends of the sidewall applicator bag means 253 so that when the bag means are inflated, as shown at FIG. 25, the ply turn-up bag means is disposed in an indented portion of the lower portion of the sidewall applicator bag means 253.

An annular frame member 261 is mounted on a fixed frame member 262 defines an annular recess in which the opposite ends of the encasing sleeve means 36 are mounted.

The inner end of frame member 262 is provided with a radial outwardly extending sleeve portion 263 on which the outer end portions of the encasing sleeve 36 are supported. Also at the inner end of frame member 262 there is pivotally mounted at the outer end thereof, as at 269, back-up means 270 having an arm 271 of a configuration of a sidewall reversely curved from the tread of a tire and inwardly at the tire beads of a conventional completed tire. The inner end of arm 271 of back-up means 270 is connected as at 275 to the ends of the deck segments of the intermediate drum assembly 4.

OPERATION OF THE ABOVE DESCRIBED THIRD EMBODIMENT OF THE INVENTION

Figure 24:
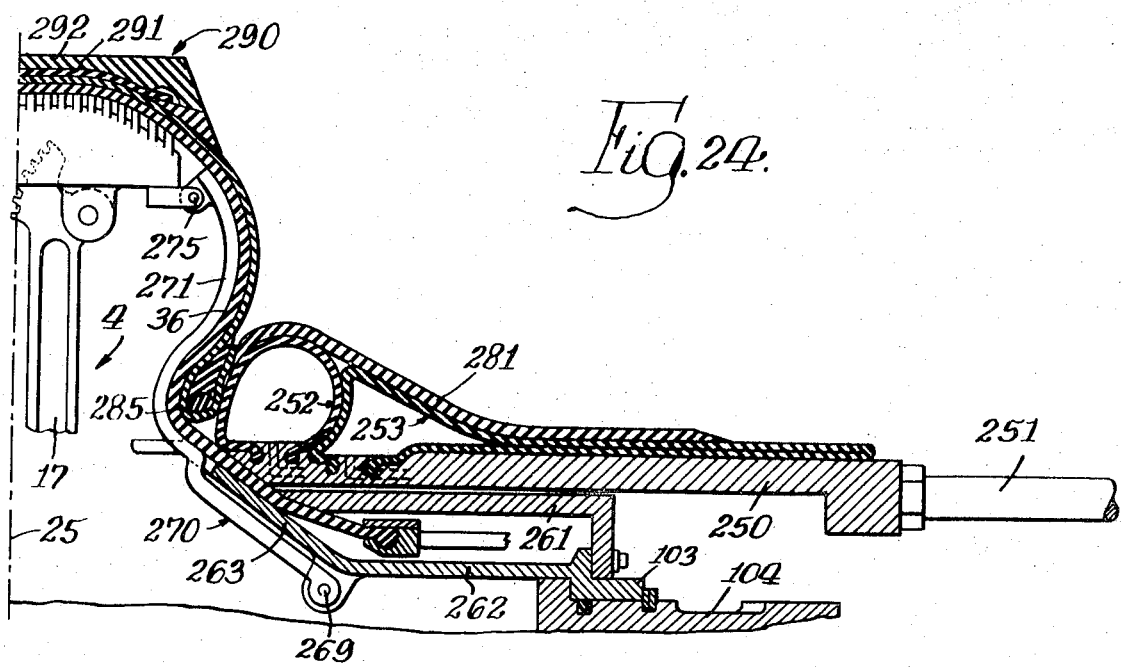

The parts are initially disposed in the position shown in FIG. 22 in which tire carcass material 280 surrounds the intermediate drum assembly and extends with its outer end portion disposed above a sidewall component 281 supported on the combined ply turn-up and side applicator bag means. If desired, a bead liner 282 may be appropriately located on the tire carcass material. Thereafter, the intermediate drum assembly 4 is radially expanded, as described in connection with the first embodiment of the invention, and the link 270 is moved axially inwardly to form the tire carcass material into the shape of a cured tire in the bead area. With the parts in this position the tire bead placing and pusher ring means 284 having a tire bead 285, as shown in FIG. 22, mounted at the end thereof, which is then moved axially inwardly, as shown in FIG. 22, to seat the tire bead 285 at the bead seat of the shaped tire carcass material. Referring now to FIG. 24 the tire bead placing and bag ring means 284 are retracted to the position shown in FIG. 23, and the ply turn-up bag means 252 is inflated under high pressure to encase the tire bead 285 in the outer end portion of the tire carcass material. In the position of the parts as shown in FIGS. 23 and 24, expansion of the intermediate drum assembly 4 has effected pivotal movement of the back-up means 270 about its pivot 269 to engage the inner surface of the sidewall portion of the tire carcass material to impart a curved configuration thereto conforming to that of a conventional tire.

After encasing of the tire beads 285 as described, and as shown in FIG. 25, the bead placing and pusher ring means is again advanced axially inwardly to engage the inflated sidewall applicator bag means 253 to apply the sidewall to the outer sidewall portion of the shaped tire carcass material.

In completing the tire, tread means, such as indicated at 290 and which may comprise a tread breaker 291 and a tread cap 292, may be applied and stitched to the crown portion of the shaped tire carcass material. Thereafter the parts are returned to the position shown in FIG. 22 and the formed tire carcass material with the embedded beads, the applied sidewalls, and the tread means is then cured in a conventional curing press to complete the tire.

While there has been shown and described certain preferred embodiments of the invention it will be understood that various modifications and rearrangements may be made therein without departing from the spirit and scope of the invention.

The invention claimed is:

1. In a tire building apparatus having an intermediate radially expandable drum, intermediate drum expanding and contracting means associated with said intermediate expandable drum to dispose the same in positions defining rigid supporting surfaces of different radii, an end drum assembly at each end of said intermediate drum, said intermediate drum and said end drum assemblies providing for support of tire carcass material therearound, the combination therewith of inflatable dual bag means supported by said end drum assemblies comprising a low pressure bag means and a high pressure bag means, said high pressure bag means being adapted upon inflation thereof to form ply turn-ups encasing the tire beads with the tire carcass material on said end drum assemblies, rigid tire carcass back-up means attached to the inner ends of said end drum assemblies, said back-up means in the inward positions of said end drum assemblies being adapted to be disposed against the inner surfaces of the tire carcass material in the tire bead area in the expanded position of the intermediate drum forming the tire carcass material into expanded tire shape form, said back-up means serving to take the reaction of inflation of said high pressure bag means in encasing the tire beads with the carcass material in forming the ply turn-ups, said low pressure bag means being adapted upon inflation thereof to apply sidewall components to the tire carcass material radially outwardly of the tire beads, and said high pressure bag means and said low pressure bag means providing uninterrupted contact with the outer surfaces of the ply turn-ups and sidewalls of the tire carcass.

2. The tire building apparatus of claim 1 characterized by the provision of bag pusher means adapted upon inflation of said low pressure bag means to engage said low pressure bag means to apply the sidewall component to the tire carcass material when shaped to torus configuration by movement of the movable intermediate drum expanding and contracting means to expand the intermediate drum.

3. The tire building apparatus of claim 1 characterized by pressurizing the interior of the apparatus to take the reaction force in the application of sidewall components to the sides of the tire carcass material.

4. The tire building apparatus of claim 3 in which the intermediate drum and expanding means includes supporting members having outer surfaces defining a crown surface while the interior of the apparatus is under pressure and during movement of said intermediate expandable drum to form the tire carcass material into substantially torus configuration.

5. The tire building apparatus of claim 1 in which shaft means extend longitudinally through said intermediate expandable drum with opposite end portions extending axially outwardly thereof, carrier means mounted for axial movement toward and away from each other on said opposite end portions of said shaft means, said end drum assemblies mounted on said carrier means at opposite ends of said intermediate drum, tire bead supporting and locking means at the inner ends of said drum assemblies, locating means connected with said tire bead supporting and locking means to move the latter to operative and inoperative positions with said tire bead supporting and locking means in operative position being adapted to lock in axially spaced apart relation equidistant of the transverse centerline of said intermediate drum and concentrically of the longitudinal axis of the apparatus, the tire beads at the outer ends of the tire carcass material surrounding said intermediate drum assembly and the inner ends of said end drum assemblies in which said inflatable bag means are carried by each of said end drum assemblies with the inner ends of said dual inflatable bag means in the operative position of said bead supporting and locking means being clamped together with the outer ends of the tire carcass material at the tire beads, and positioning means for positioning said tire bead back-up means at the inner surfaces of the tire carcass material opposite the tire beads.

6. The tire building apparatus of claim 5 characterized by said end drum assemblies having ply tensioning means associated therewith comprising tension cylinder means, piston means for said carrier means disposed in said tension cylinder means, and means for admitting fluid under pressure into said tension cylinder at one end thereof to tension the tire carcass material between said tire bead supporting and locking means in the operative positions thereof and upon movement of the axially movable expanding and contracting means for the intermediate drum toward each other forming the tire carcass material into torus configuration.

7. The tire building apparatus of claim 6 in which said intermediate expandable drum embodies radially and circumferentially movable supporting members which in their outer positions define a crown surface substantially conforming to that of the crown of a cured tire.

8. The tire building apparatus of claim 6 characterized by the provision of means for bleeding fluid under pressure from said one end of said tension cylinder means, and means for admitting fluid under pressure to the other end of said tension cylinder means whereby said end drum assemblies dispose said tire bead supporting and locating means axially inwardly of the sidewalls of the tire carcass material which, together with means for admitting fluid under pressure into said tire carcass material, form the latter into the shape of a cured tire at the bead area.

9. The tire building apparatus of claim 8 characterized by the provision of stroke limiting means for engaging the outer ends of said carrier means to limit the inward axial positions of said tension cylinder means.

10. The tire building apparatus of claim 6 characterized by said tensioning means having associated therewith tire bead supporting and locating means associated with said tensioning means for disposing said bead supporting and locking means to their operative and inoperative positions.

11. The tire building apparatus of claim 6 characterized by said tensioning means having locating means including piston means for positioning said tire bead back-up means to operative and inoperative positions.

12. In a tire building apparatus the combination of an intermediate expandable drum, and an end drum assembly at each end of said intermediate drum, means associated with said intermediate expandable drum to dispose the drum in positions defining supporting surfaces of different radii, tire carcass material supported on said apparatus adapted upon expansion of said intermediate drum to displace said tire carcass material into tire shape form having an outer peripheral crown portion, radially inwardly extending sidewall portions having tire bead areas at their inner ends, and outer end portions of the tire carcass material extending axially outwardly from said sidewall portions and supported on said end drum assemblies, rigid back-up means for the bead areas of the tire carcass material associated with said end drum assemblies providing for curving said sidewall portions axially outwardly adjacent to the bead areas after expansion of said intermediate drum, and ply turn-up means for turning up the outer end portions of said tire carcass material to encase tire beads at said bead areas and firmly apply the same to the outer surfaces of said sidewall portions outwardly of the inner ends of said sidewall portions.

13. The apparatus of claim 12 characterized by the provision of sidewall applicator means for applying tire sidewall components to the outer surfaces of said sidewalls of said tire carcass material.

14. The apparatus of claim 12 in which said ply turn-up means comprises inflatable ply turn-up bag means upon which the outer end portions of said tire carcass material are supported, said inflatable bag ply turn-up means, when inflated, encasing the tire beads with the tire carcass material thereon and applying the same to the sidewalls of the tire carcass material.

15. The apparatus of claim 14 wherein said sidewall applicator means comprises sidewall inflatable bag means for supporting tire wall components thereon, and pusher means adapted upon inflation of said sidewall inflatable bag means with said sidewall components to apply said sidewall components to the sidewalls of said tire carcass material.

16. The apparatus of claim 15 characterized by means for pressurizing the interior of the tire carcass upon the application of the sidewall components to the sidewalls of the tire carcass material.

17. The apparatus of claim 1 in which said high pressure ply turn-up bag means is disposed within said low pressure bag means.

18. The apparatus of claim 1 in which the inner end of said high pressure bag means is integral with the inner end of said low pressure bag means at the bead areas of the tire carcass material.

19. The apparatus of claim 1 in which said dual bag means comprises inflatable ply turn-up bag means and side wall applicator means comprising side wall applicator bag means and in which said inflatable ply turn-up bag means overlies the inner end of said inflatable side wall bag means in the deflated positions of said ply turn-up bag means and said side wall applicator bag means.

\* \* \* \* \*